United States Patent
Wang

(10) Patent No.: US 9,170,549 B2
(45) Date of Patent: Oct. 27, 2015

(54) TORQUE RECEIVING ASSEMBLY, PHOTOSENSITIVE DRUM AND PROCESS CARTRIDGE

(71) Applicant: PRINT-RITE • UNICORN IMAGE PRODUCTS CO., LTD. OF ZHUHAI

(72) Inventor: Qile Wang, Guangdong (CN)

(73) Assignee: PRINT-RITE • UNICORN IMAGE PRODUCTS CO., LTD. OF ZHUHAI, Guangdong (CN)

( * ) Notice: Subject to any disclaimer, the term of this patent is extended or adjusted under 35 U.S.C. 154(b) by 0 days.

(21) Appl. No.: 14/340,007

(22) Filed: Jul. 24, 2014

(65) Prior Publication Data
US 2015/0030353 A1   Jan. 29, 2015

(30) Foreign Application Priority Data
Jul. 25, 2013   (CN) .......................... 2013 1 0316731

(51) Int. Cl.
*G03G 15/00* (2006.01)
*G03G 21/18* (2006.01)
*F16D 3/06* (2006.01)

(52) U.S. Cl.
CPC .............. *G03G 15/757* (2013.01); *F16D 3/06* (2013.01); *G03G 21/186* (2013.01); *G03G 21/1857* (2013.01); *G03G 2221/1657* (2013.01)

(58) Field of Classification Search
CPC .............. G03G 15/757; G03G 21/186; G03G 21/1857; G03G 2221/1657; F16D 3/06
See application file for complete search history.

(56) References Cited

U.S. PATENT DOCUMENTS

| | | | | |
|---|---|---|---|---|
| 2011/0159970 A1* | 6/2011 | Okabe | ........................ | 464/169 |
| 2011/0255900 A1* | 10/2011 | Zhou et al. | ................... | 399/111 |
| 2012/0294649 A1* | 11/2012 | Kikuchi et al. | ............... | 399/117 |
| 2013/0322923 A1* | 12/2013 | Ikeda | ............................ | 399/117 |
| 2015/0050049 A1* | 2/2015 | Huang | .......................... | 399/167 |

* cited by examiner

*Primary Examiner* — Rodney Bonnette
(74) *Attorney, Agent, or Firm* — Cozen O'Connor

(57) ABSTRACT

A torque receiving assembly, a photosensitive drum and a process cartridge having such torque receiving assembly. The torque receiving assembly having a body having an axis and having an accommodating chamber; a driven shaft disposed coaxially with the body, the driven shaft including a guide stem and a coupling head provided at one axial end of the guide stem, the guide stem having a pair of output arms which extend outwardly in a radial direction, the coupling head having a plurality of projections; wherein a pair of input arms are provided at an inner wall of the accommodating chamber and configured for abutting with the output arms; the guide stem is movable in the axial direction relative to the body, the torque receiving assembly further comprises a distance-limiting mechanism that defines a maximum distance the driven shaft is able to move relative to the body in the axis direction. The photosensitive drum and process cartridge according to the present invention both include the torque receiving assembly.

20 Claims, 15 Drawing Sheets

A-A

B-B

US 9,170,549 B2

TORQUE RECEIVING ASSEMBLY, PHOTOSENSITIVE DRUM AND PROCESS CARTRIDGE

FIELD OF THE INVENTION

The present invention relates to a torque receiving assembly for transmitting rotational force, and a photosensitive drum and a process cartridge to which said torque receiving assembly is mounted as a component. The present invention claims priority from Chinese patent application No. 201310316731.2 filed on Jul. 25, 2013, which is hereby incorporated as reference.

DESCRIPTION OF RELATED ART

FIG. 1 illustrates an image forming process for a laser printer in which a process cartridge works as a core element. First, an outer peripheral surface of a photosensitive drum 101 is electrically charged uniformly by a charge roller 102, and a laser scanner 103 radiates a modulated laser beam 104 containing image information to the outer peripheral surface of the drum 101. Then an unevenly distribution of electrostatic charge, i.e. an electrostatic latent image corresponding to an image to be printed, is formed on the outer peripheral surface of the drum after irradiated by the laser beam. Subsequently, a developing agent such as toner conveyed by a developing roller 105 which has been regularized by a doctor blade 113, is transmitting to the outer peripheral surface of the photosensitive drum and covering the aforementioned latent image, and converting it to a visual image which can be seen by eyes. With rotation of the photosensitive drum 101, the visual image moves to a position where a transfer roller is provided. By applying a voltage carried by the transfer roller 107, the toner is transferred onto an outer surface of a recording medium 108 such as paper, then the toner is headed and pressed by a heating roller 111 and a pressing roller 112, and penetrated into the fiber layer of the recording medium 108, so the visual image formed by toner is permanently fixed on the recording medium 108. After the visual image on the photosensitive drum 101 is transferred by the transfer roller 107, the toner remaining on the photosensitive drum 101 is cleaned by a cleaning blade 110 and conveyed into a waste toner container, and the electrostatic on the surface of the photosensitive drum is eliminated by an eliminating device, then the photosensitive drum is recovered to a standby state without electric and toner. Thus, a basic image forming process is completed. The process operating in cycles repeatedly will result in forming a printed image needed by a user.

The rotational force, i.e. torque, generated by the aforementioned laser printer, is transmitting to the photosensitive drum 101 by a drive shaft, and then bringing the process cartridge into a working state. In US patent application publication NO. 2008/0152388A1, a process cartridge having a torque receiving assembly comprising a ball-type universal joint provided on one end of its drum, is disclosed. This ball-type universal joint tends to be undesirably detachable from the flange, especially during transportation, and this phenomenon will result in the ball-type universal joint losing its transmitting function or working stability.

SUMMARY OF THE INVENTION

To solve the easily detachment problem of the ball-type universal joint, a principal object of the present invention is to provide a torque receiving assembly which is reliable and stable during rotational force transmitting.

Another object of the present invention is to provide a photosensitive drum using the aforementioned torque receiving assembly. The photosensitive drum comprising such torque receiving assembly is reliable and stable during rotational force transmitting.

A further object of the present invention is to provide a process cartridge for a laser printer in which the aforementioned torque receiving assembly mounted as a component. The process cartridge comprising such torque receiving assembly can be mounting smoothly, and be reliable and stable during rotational force transmitting.

A torque receiving assembly is provided by the present invention. The torque receiving assembly comprises: a body having an axis and having an accommodating chamber; a driven shaft disposed coaxially with said body, the driven shaft including a guide stem and a coupling head provided at one axial end of said guide stem, the guide stem having a pair of output arms which extend outwardly in a radial direction, the coupling head having a plurality of projections; wherein a pair of input arms are provided at an inner wall of the accommodating chamber and configured for abutting with the output arms; the guide stem is movable in the axial direction relative to the body, the torque receiving assembly further comprises a distance-limiting mechanism that defines a maximum distance the driven shaft is able to move relative to the body in the axis direction.

Preferably, in the torque receiving assembly, the accommodating chamber is a cylindrical chamber provided coaxially with the body.

Preferably, in the torque receiving assembly, the accommodating chamber is a regular polygon chamber provided coaxially with the body.

Preferably, in the torque receiving assembly, a recess recessing inwardly in the axial direction of the guide stem is provided at central portion of the outer end wall of the coupling head.

Preferably, in the torque receiving assembly, the recess has a spherical shape. The center of the recess is provided on the axial line of the guide stem.

Preferably, in the torque receiving assembly, the recess has a polygon cross section. The center of a phantom circle connecting all angle points of the polygon is provided on the axis of the guide stem.

Preferably, in the torque receiving assembly, a portion around the recess of the end wall of the coupling head is curved and projecting away from the guide stem in the axial direction of the guide stem.

Preferably, in the torque receiving assembly, the body includes a guiding hole capable of guiding the guide stem along the axis direction, the distance-limiting mechanism comprises a retaining cover and a urging spring, the retaining cover is fixed to an open end of the accommodating chamber to retain part of the driven shaft in the accommodating chamber, the urging spring is interposed between the output arms and a bottom wall of the accommodating chamber for urging the driven shaft outwardly in the axis direction.

Preferably, in the torque receiving assembly, the body includes a guiding hole capable of guiding the guide stem, the distance-limiting mechanism comprises a retaining cover and a tension spring, the retaining cover is fixed to an open end of the accommodating chamber to retain part of the driven shaft in the accommodating chamber, the tension spring is disposed outside of the accommodating chamber with one end is connected to an end of the guide stem and the other end is connected to an end wall around the guiding hole of the body.

Preferably, in the torque receiving assembly, the distance-limiting mechanism comprises a retaining cover and a urging spring, the retaining cover is mounted on an open end of the accommodating chamber to retain the driven shaft, the urging spring is interposed between the output arms and a bottom wall of the accommodating chamber for urging the driven shaft outwardly in the axis direction, a gap is provided between an end of the driven shaft and the bottom wall when the driven shaft is at a farthest position from the bottom wall, the gap has a axial length that is longer than an axial length of the projection.

Preferably, in the torque receiving assembly, the distance-limiting mechanism comprises a retaining cover, a first magnet and a second magnet, the retaining cover is mounted on an open end of the accommodating chamber to retain the driven shaft, the first magnet is fixed to an end of the guide stem that is opposite to the coupling head, the second magnet is fixed on an bottom wall of the accommodating chamber with a gap away from the first magnet, the first and second magnets are disposed such that each has a same polarity facing each other, the gap has a axial length that is longer than an axial length of the projection.

Preferably, in the torque receiving assembly, the distance-limiting mechanism comprises a retaining cover, a first magnet and a second magnet, the retaining cover is mounted on an open end of the accommodating chamber to retain the driven shaft, the first magnet is fixed to an end of the guide stem that is opposite to the coupling head, the second magnet is fixed on an bottom wall of the accommodating chamber with a gap away from the first magnet, the first and second magnets are disposed such that each has a same polarity facing each other, the gap has a axial length that is longer than an axial length of the projection.

Preferably, in the torque receiving assembly, the distance between an outer wall of the projection in a radial direction away from the axial line of the guide stem and the extended axial line of the guide stem reduces gradually along the extending direction of the projection.

Preferably, in the torque receiving assembly, the projection has a rectangle shape in a cross section parallel to the axial direction of the guide stem.

Preferably, in the torque receiving assembly, the projection has a step at the outer wall of the guide stem in a cross section parallel to the axial direction of the guide stem. The distance between the step and the extended axial line of the guide stem is tapering in the extending direction of the projection.

Preferably, in the torque receiving assembly, the projection has a trapezoid shape in a cross section parallel to the axial direction of the guide stem, and the bevel edge of the trapezoid is out of the guide stem in the radial direction. The distance between the bevel edge and the extended axial line of the guide stem is tapering in the extending direction of the projection away from the guide stem.

A photosensitive drum is provided based on the first object of the present invention, comprises: a body having an axis and having an accommodating chamber; a driven shaft disposed coaxially with said body, the driven shaft including a guide stem and a coupling head provided at one axial end of said guide stem, the guide stem having a pair of output arms which extend outwardly in a radial direction, the coupling head having a plurality of projections; wherein a pair of input arms are provided at an inner wall of the accommodating chamber and configured for abutting with the output arms; the guide stem is movable in the axial direction relative to the body, the torque receiving assembly further comprises a distance-limiting mechanism that defines a maximum distance the driven shaft is able to move relative to the body in the axis direction.

Optimized, in the photosensitive drum, the accommodating chamber is a cylindrical chamber provided coaxially with the body.

Optimized, in the photosensitive drum, the accommodating chamber of the torque receiving assembly is a regular polygon chamber provided coaxially with the body.

Optimized, in the photosensitive drum, a recess recessing inwardly in the axial direction of the guide stem is provided at central portion of the outer end wall of the coupling head of the torque receiving assembly.

Optimized, in the photosensitive drum, the recess of the torque receiving assembly has a spherical shape. The center of the recess is provided on the axial line of the guide stem.

Optimized, in the photosensitive drum, the outer wall of the recess has a polygon shape in a cross section vertical to the axial direction of guide stem. The center of a phantom circle connecting all angle points of the polygon is provided on the axis of the guide stem.

Optimized, in the photosensitive drum, the portion around the recess of the end wall of the coupling head is curved and projecting away from the guide stem in the longitude direction of the guide stem.

Optimized, in the photosensitive drum, the body includes a guiding hole capable of guiding the guide stem along the axis direction, the distance-limiting mechanism comprises a retaining cover and a urging spring, the retaining cover is fixed to an open end of the accommodating chamber to retain part of the driven shaft in the accommodating chamber, the urging spring is interposed between the output arms and a bottom wall of the accommodating chamber for urging the driven shaft outwardly in the axis direction.

Optimized, in the photosensitive drum, the body includes a guiding hole capable of guiding the guide stem, the distance-limiting mechanism comprises a retaining cover and a tension spring, the retaining cover is fixed to an open end of the accommodating chamber to retain part of the driven shaft in the accommodating chamber, the tension spring is disposed outside of the accommodating chamber with one end is connected to an end of the guide stem and the other end is connected to an end wall around the guiding hole of the body.

Optimized, in the photosensitive drum, the distance-limiting mechanism comprises a retaining cover and a urging spring, the retaining cover is mounted on an open end of the accommodating chamber to retain the driven shaft, the urging spring is interposed between the output arms and a bottom wall of the accommodating chamber for urging the driven shaft outwardly in the axis direction, a gap is provided between an end of the driven shaft and the bottom wall when the driven shaft is at a farthest position from the bottom wall, the gap has a axial length that is longer than an axial length of the projection.

Optimized, in the photosensitive drum, the distance-limiting mechanism comprises a retaining cover, a first magnet and a second magnet, the retaining cover is mounted on an open end of the accommodating chamber to retain the driven shaft, the first magnet is fixed to an end of the guide stem that is opposite to the coupling head, the second magnet is fixed on an bottom wall of the accommodating chamber with a gap away from the first magnet, the first and second magnets are disposed such that each has a same polarity facing each other, the gap has a axial length that is longer than an axial length of the projection.

Optimized, in the photosensitive drum, the distance-limiting mechanism comprises a retaining cover, a first magnet and a second magnet, the retaining cover is mounted on an open end of the accommodating chamber to retain the driven shaft, the first magnet is fixed to an end of the guide stem that is opposite to the coupling head, the second magnet is fixed on an bottom wall of the accommodating chamber with a gap away from the first magnet, the first and second magnets are disposed such that each has a same polarity facing each other, the gap has a axial length that is longer than an axial length of the projection.

Optimized, in the photosensitive drum, the distance between an outer wall of the projection in a radial direction away from the axial line of the guide stem and the extended axial line of the guide stem reduces gradually along the extending direction of the projection.

Optimized, in the photosensitive drum, the projection has a rectangle shape in a cross section parallel to the axial direction of the guide stem.

Optimized, in the photosensitive drum, the projection has a step at the outer wall of the guide stem in a cross section parallel to the axial direction of the guide stem. The distance between the step and the extended axial line of the guide stem is tapering in the extending direction of the projection.

Optimized, in the photosensitive drum, the projection has a trapezoid shape in a cross section parallel to the axial direction of the guide stem, and the bevel edge of the trapezoid is out of the guide stem in the radial direction. The distance between the bevel edge and the extended axial line of the guide stem is tapering in the extending direction of the projection away from the guide stem.

To achieve the aforementioned objects, the present invention also provides a process cartridge including a photosensitive drum, and the photosensitive drum including a drum cylinder and a torque receiving assembly, the torque receiving wherein the body includes a guiding hole capable of guiding the guide stem, the distance-limiting mechanism comprises a retaining cover and a tension spring, the retaining cover is fixed to an open end of the accommodating chamber to retain part of the driven shaft in the accommodating chamber, the tension spring is disposed outside of the accommodating chamber with one end is connected to an end of the guide stem and the other end is connected to an end wall around the guiding hole of the body.

Advantageously, in the process cartridge, the accommodating chamber is a cylindrical chamber provided coaxially with the body.

Advantageously, in the process cartridge, the accommodating chamber of the torque receiving assembly is a regular polygon chamber provided coaxially coaxial with the body.

Advantageously, in the process cartridge, a recess recessing inwardly in the axial direction of the guide stem is provided at central portion of the outer end wall of the torque receiving assembly.

Advantageously, in the process cartridge, the recess of the torque receiving assembly has a spherical shape. The center of the recess is provided on the axial line of the guide stem.

Advantageously, in the process cartridge, the outer wall of the recess has a polygon shape in a cross section vertical to the axial direction of guide stem. The center of a phantom circle connecting all angle points of the polygon is provided on the extended axial line of the guide stem.

Advantageously, in the process cartridge, a portion around the recess of the end wall of the coupling head is curved and projecting away from the guide stem in the axial direction of the guide stem.

Advantageously, in the process cartridge, the body includes a guiding hole capable of guiding the guide stem along the axis direction, the distance-limiting mechanism comprises a retaining cover and an urging spring, the retaining cover is fixed to an open end of the accommodating chamber to retain part of the driven shaft in the accommodating chamber, the urging spring is interposed between the output arms and a bottom wall of the accommodating chamber for urging the driven shaft outwardly in the axis direction.

Advantageously, in the process cartridge, the body includes a guiding hole capable of guiding the guide stem, the distance-limiting mechanism comprises a retaining cover and a tension spring, the retaining cover is fixed to an open end of the accommodating chamber to retain part of the driven shaft in the accommodating chamber, the tension spring is disposed outside of the accommodating chamber with one end is connected to an end of the guide stem and the other end is connected to an end wall around the guiding hole of the body.

Advantageously, in the process cartridge, the distance-limiting mechanism comprises a retaining cover and an urging spring, the retaining cover is mounted on an open end of the accommodating chamber to retain the driven shaft, the urging spring is interposed between the output arms and a bottom wall of the accommodating chamber for urging the driven shaft outwardly in the axis direction, a gap is provided between an end of the driven shaft and the bottom wall when the driven shaft is at a farthest position from the bottom wall, the gap has a axial length that is longer than an axial length of the projection.

Advantageously, in the process cartridge, the distance-limiting mechanism of the torque receiving assembly comprises a cover, a first magnet and a second magnet. The cover is fixed to the outer open of the accommodating chamber. The position of the output arm is limited in the accommodating chamber by the cover. The first magnet is fixed to the end of the guide stem opposite to the input head. The second magnet is fixed on the bottom wall of the accommodating chamber opposite the outer open. The surfaces of the first magnet and the second magnet which are facing each other have the same polarity. A gap is provided between the first and second magnet in the axial direction of the body. The width of the gap in the axial direction of the body is longer than a projecting length projected in the axial direction of the accommodating chamber of a distance between the outer end wall of the input head and the extending end of the projection in the axial direction of the accommodating chamber.

Advantageously, in the process cartridge the distance-limiting mechanism comprises a retaining cover, a first magnet and a second magnet, the retaining cover is mounted on an open end of the accommodating chamber to retain the driven shaft, the first magnet is fixed to an end of the guide stem that is opposite to the coupling head, the second magnet is fixed on an bottom wall of the accommodating chamber with a gap away from the first magnet, the first and second magnets are disposed such that each has a same polarity facing each other, the gap has a axial length that is longer than an axial length of the projection.

Advantageously, in the process cartridge, the distance between an outer wall of the projection in a radial direction away from the axial line of the guide stem and the extended axial line of the guide stem is tapering in the extending direction of the projection away from the guide stem.

Advantageously, in the process cartridge the projection has a rectangle shape in a cross section parallel to the axial direction of the guide stem.

Advantageously, in the process cartridge, the projection has a step at the outer wall of the guide stem in a cross section parallel to the axial direction of the guide stem. The distance between the step and the extended axial line of the guide stem is tapering in the extending direction of the projection.

Advantageously, in the process cartridge, the projection has a trapezoid shape in a cross section parallel to the axial direction of the guide stem, and the bevel edge of the trapezoid is out of the guide stem in the radial direction. The distance between the bevel edge and the extended axial line of the guide stem is tapering in the extending direction of the projection.

With regard to the problem of the ball-type universal joint for transmitting rotational force easily detachment from the drum gear, the present invention provides a torque receiving assembly. The torque receiving assembly provides an input arm on its body, and the concerted relationship between a driven shaft and the body is capable of moving reciprocally to each other in the axial or longitude direction of the body, and a distance-limiting mechanism is defining a moving area of the driven shaft in the axial direction of the body, and simultaneously a cover of the distance-limiting mechanism limits the output arm in the accommodating chamber, so that the driven shaft as integrated is fixed to the body. In such constitution method, the input arm of the body is receiving rotational driving force from the output arm of the driven shaft, and causing the body to rotate, then to drive other working components into rotation working state. At the same time, the distance-limiting mechanism defines the moving area of the driven shaft in the axial direction of the body, and limits the guide stem of driven shaft in the accommodating chamber of the body, to avoid the risk of the driven shaft dropping from the body, so that reliability and stability can be maintained during rotational force transmitting of the whole torque receiving assembly. The photosensitive drum and process cartridge using such torque receiving assembly have the merit of stably mounting, and reliable and stable during driving force transmitting.

DESCRIPTION OF THE PRESENTLY PREFERRED EMBODIMENTS

The torque receiving assembly and photosensitive drum and imagine forming process cartridge for laser printer according to the present invention will be described in the detailed description of particular embodiments of the invention, with reference being made to the drawings.

Figure 8:
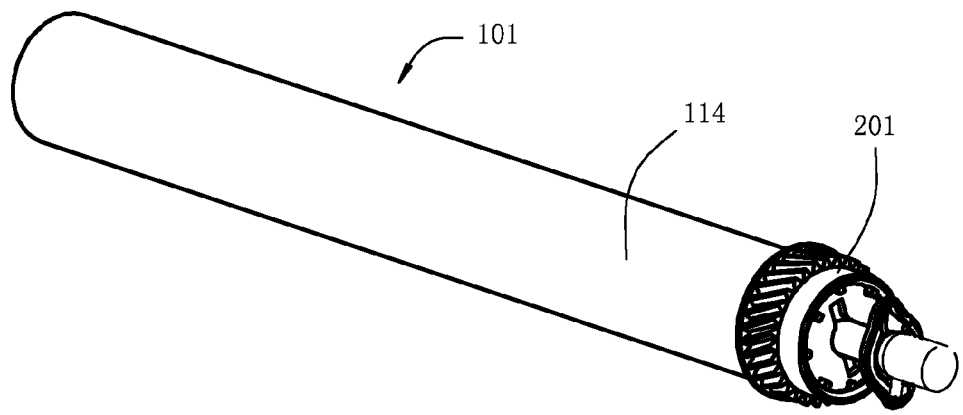
FIG. 8 is a perspective view of a photosensitive drum according to an embodiment of the present invention.
Figure 9:
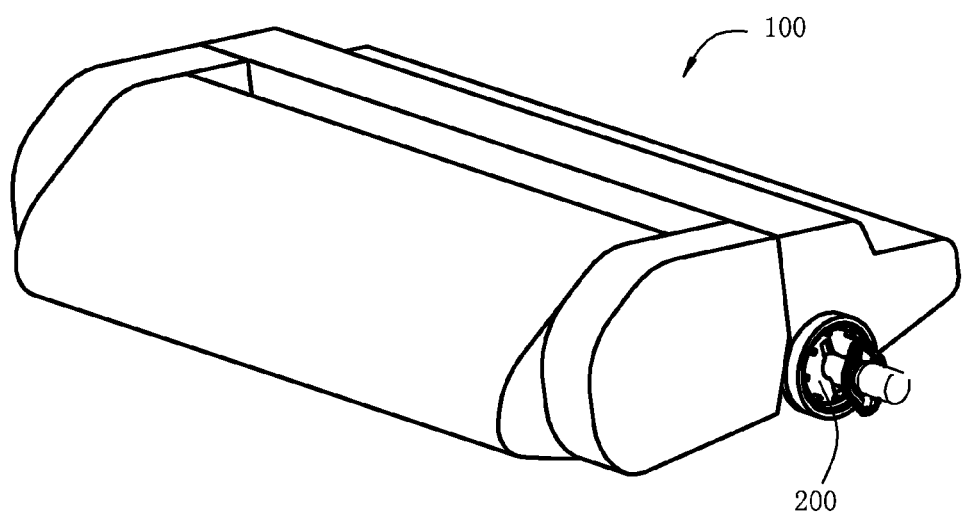
FIG. 9 is a perspective view of a process cartridge according to an embodiment of the present invention.
Figure 10:
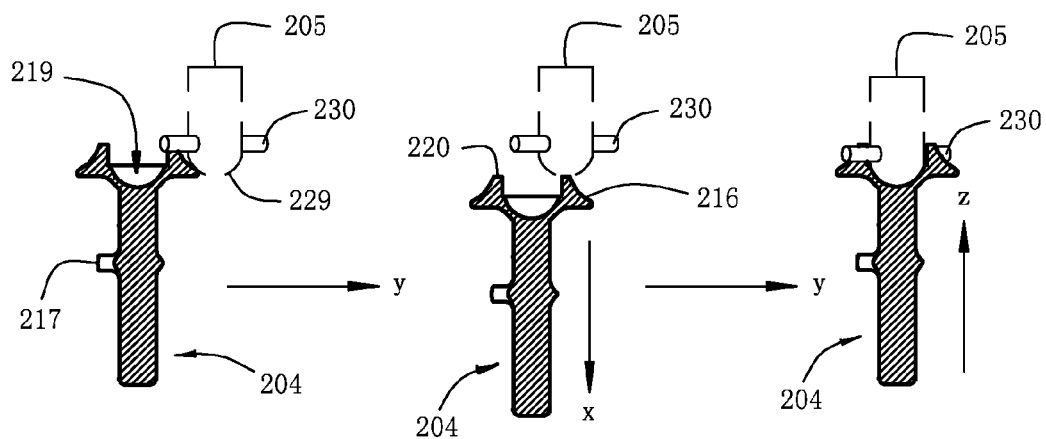
FIG. 10 schematically illustrates coupling process of the torque receiving assembly with the drive shaft according to the embodiment of the present invention and an external output device.

FIGS. 2-9 are perspective or cross-sectional views which illustrate a torque receiving assembly, a photosensitive drum and a process cartridge for a laser printer according to a first embodiment of the present invention from different perspective angles and cross-sections, and FIG. 10 is a schematic drawing which illustrates coupling process of the driven shaft of the torque receiving assembly according to the embodiment of the present invention and a drive shaft of the laser printer. In all of FIGS. 1 to 10 of the present invention, drive shaft 205 is shown in dashed line, as it is not a constituent part of the present invention.

The main or basic construction of a torque receiving assembly, the photosensitive drum for the laser printer and the image forming process cartridge are generally similar to those of the prior art. A person skilled in the art could know the basic construction of a torque receiving assembly, a photosensitive and a process cartridge in light of prior art documents combined with the background introduction of this invention. Therefore, as to similar structures, those will not be described in detail. A same reference symbol may be used to indicate a component or part having a same function as that in the prior art. Furthermore, as the objection of the present invention is to solve the easily detachment problem of the ball-type universal joint in the conventional torque transferring mechanism and provide suitable solutions, the structure relating to prevent detachment of the torque receiving assembly will be particularly described.

Figure 1:
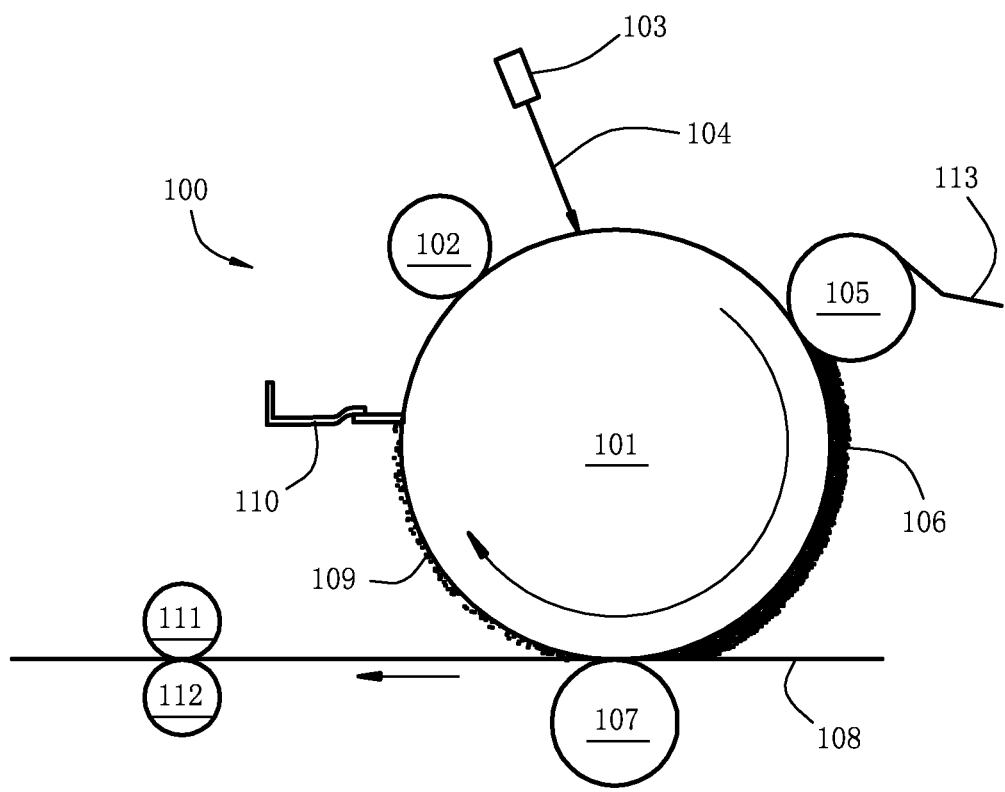
FIG. 1 schematically illustrates the main structures of the conventional laser printer.
Figure 2:
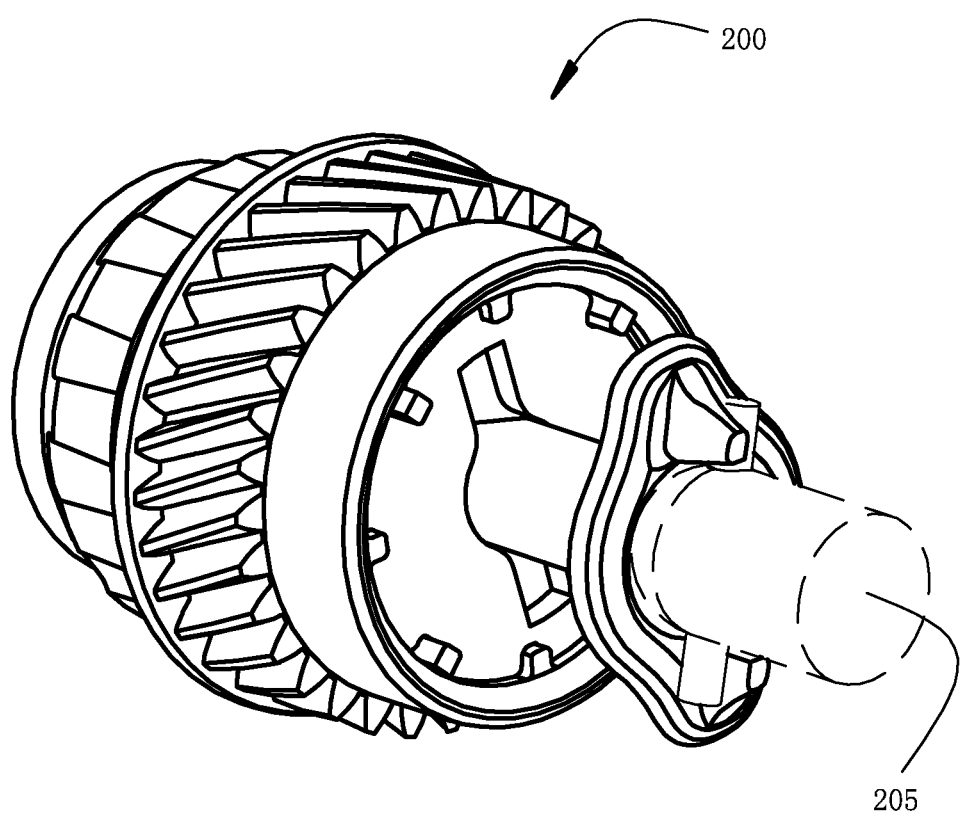
FIG. 2 is a perspective view of a torque receiving assembly according to an embodiment of the present invention.

FIG. 2 is for illustrating an engagement state where a torque receiving assembly 200 of the present invention engages with a drive shaft 205. By this, a torque, i.e., the rotational drive force is able to be transferred from the drive shaft 205 to the torque receiving assembly 200, so that the torque receiving assembly 200 is able to rotate around a rotational axis.

Figure 3:
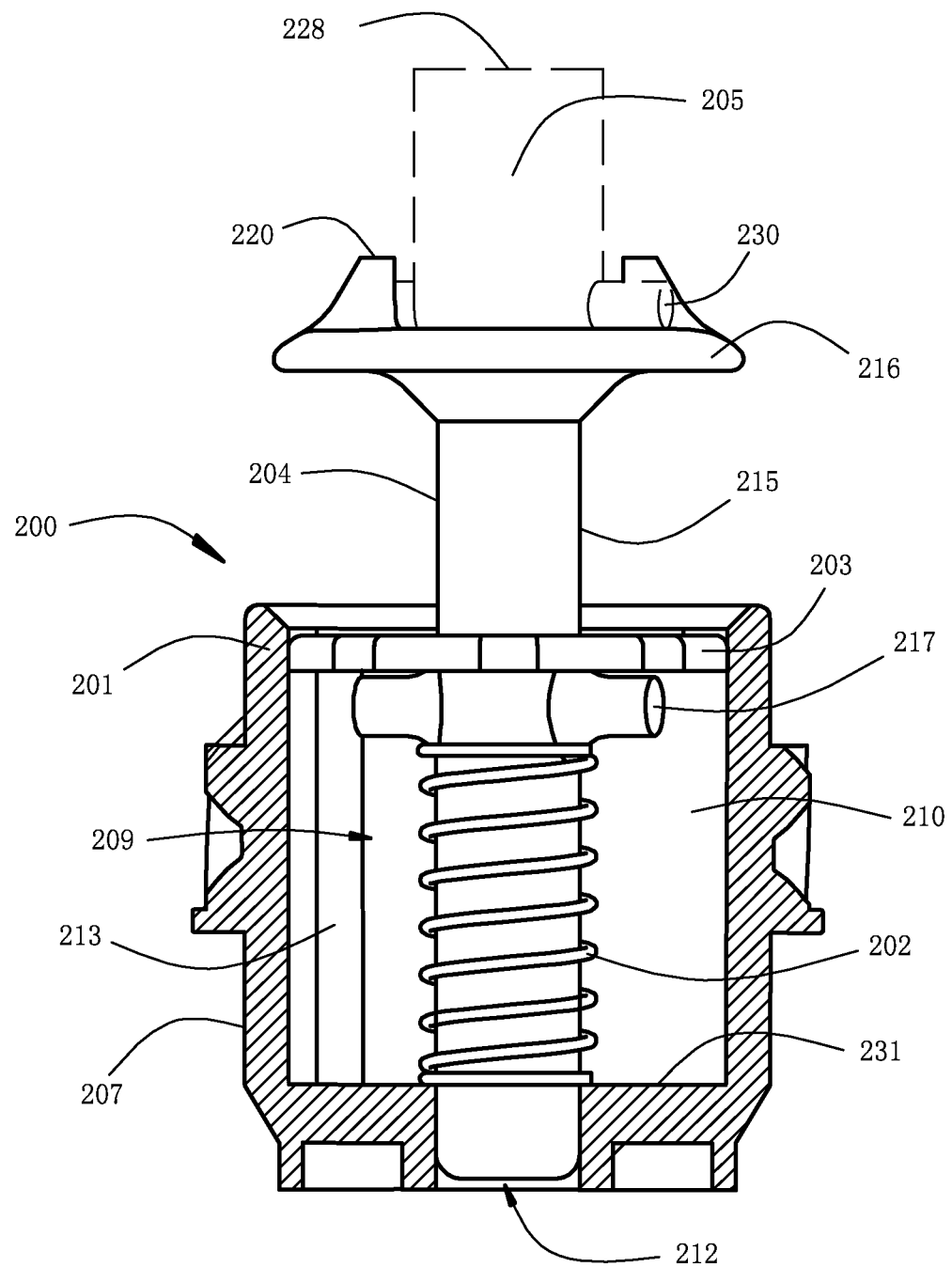
FIG. 3 is a partial cross-sectional view of the torque receiving assembly according to the embodiment of the present invention.
Figure 4:
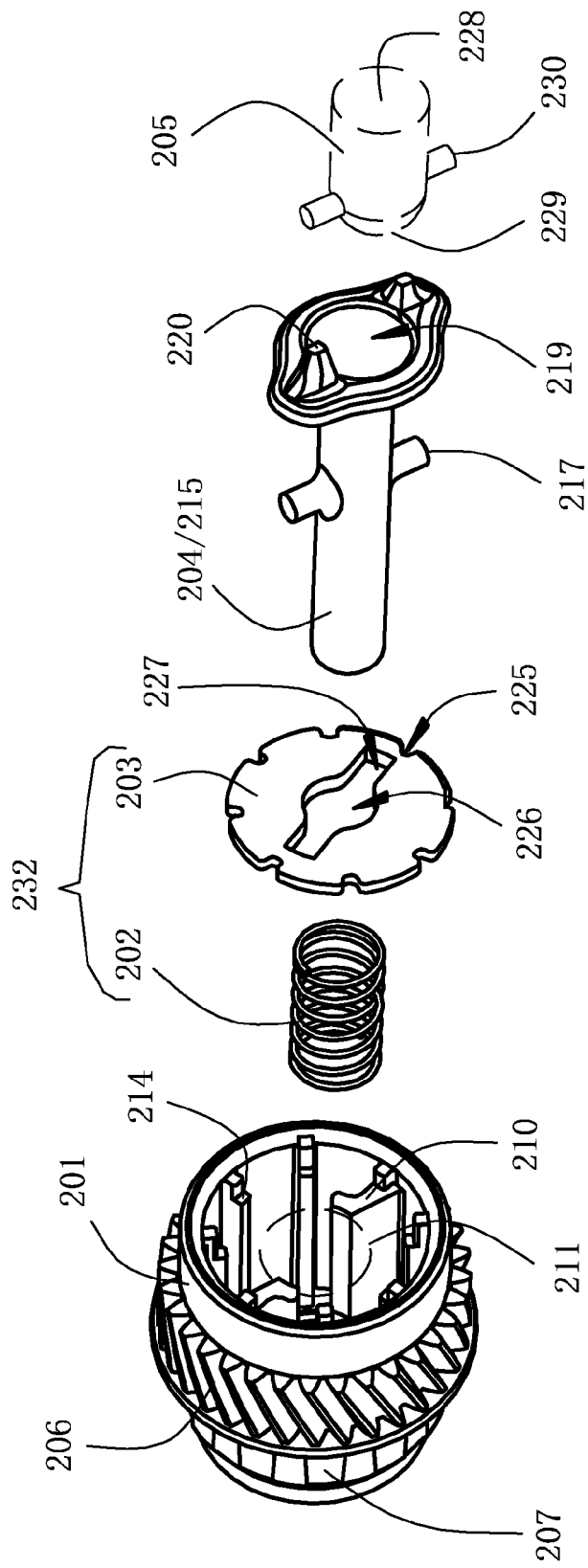
FIG. 4 is an exploded perspective view of the torque receiving assembly according to the embodiment of the present invention.
Figures 5A, 5B:
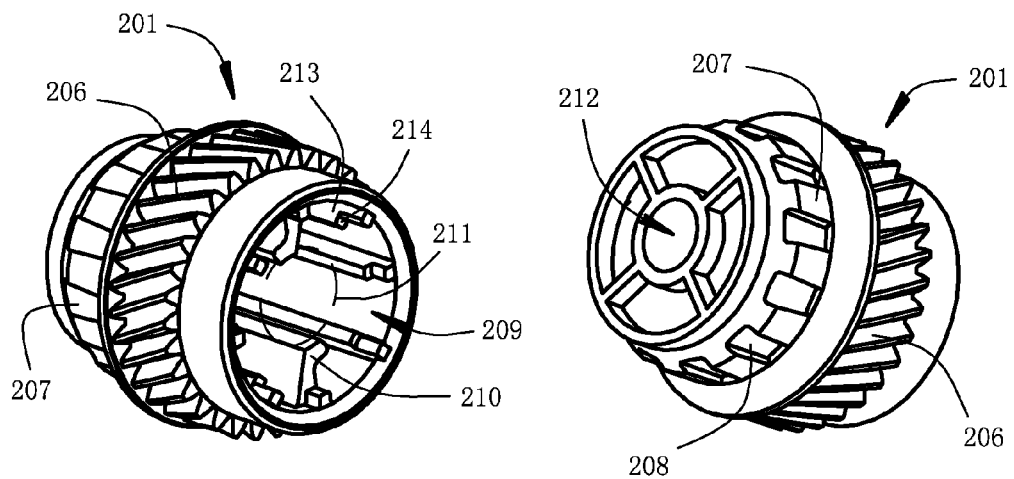
FIGS. 5a and 5b are perspective views of a body of the torque receiving assembly according to the embodiment of the present invention.

Referring to FIGS. 3-5, the torque receiving assembly 200 includes a body 201, an urging spring 202, a retaining cover 203 and a driven shaft 204. The driven shaft 204 is disposed in the center of the body 201 to receive a torque from the drive shaft 205. The torque received by the driven shaft 204 is then transmitted to the body 201.

The body 201 has a general hollow cylindrical shape, with a helical gear portion 206 provided on its outer circumference wall for transmitting the rotational driving force received by the body 201 to other members of the process cartridge.

The body 201 includes an insert portion 207, which is provided with a plurality of grooves 208. The grooves 208, spaced away from each other in a circumferential direction, are configured to provide adequate buffer space when the body 201 is inserted into one end of drum cylinder 114 (FIG. 8). The grooves 208 may be filled with glue so that the connection between the drum cylinder 114 and the body 201 would be greatly enhanced. Since the insert portion is also called a driving force transferring portion, as it would transfer driving force from the body 201 to rotate the drum cylinder 114 (FIG. 8).

Inside the body 201 is provided with an accommodating chamber 209 for accommodating part of the driven shaft 204 and a guiding hole 212 for guiding the driven shaft along the axis direction. The accommodating chamber 209 opens at its upper end where the retaining cover 203 is mounted, and communicates with the guiding hole 212 at its bottom end. Both the accommodating chamber 209 and the guiding hole 212 are coaxial with the body 201. It is preferable that the guiding hole 212 is in clearance fit with the guide stem 215 of the driven shaft.

Input arms 210, are provided on cylindrical inner wall of the accommodating chamber 209 and are rotational-symmetrically distributed around the axial line of the body 201. The number of the input arms may be two. The input arms 210 extends toward the enter portion of the body 201, and ends at a phantom circle 211. The center of the phantom circle 211 is located on the axial line of the accommodating chamber 209. The diameter of the phantom circle 211 is slightly bigger than a diameter of a guide stem 215 which will be described hereinafter. The extending directions of the two input arms 210 are parallel to each other and do not intersect at the axial line of the accommodating chamber 209.

The interval between the input arms 201 along the circumferential direction defines an angle with which the driven shaft 204 is able to rotate around the rotational axis relative to the body 201 such that the driven shaft 204 is able to adjust its posture if necessary. In this embodiment, the defined angle is an obtuse angle, in other words, the driven shaft 204 is able to rotates freely about a angle which is more than 90 degree and less than 180 degree, so that it is easier for the driven shaft 204 to engage with or disengage from the drive shaft 205.

Position posts 213, extending toward the axial line of the body 201, are radial symmetrically provided on the inner cylindrical wall of the accommodating chamber 209. The radial length of the position posts 213 is less than that of the input arms 210.

Each of the position posts 213 and input arms 210 is provided with a step portion 214 at an end opposite to the insert portion 207, which provides a mounting seat for the retaining cover 203 when the retaining cover 203 is fixed to the body 201.

The driven shaft 204 includes a cylindrical guide stem 215 and a coupling head 216 provided at one axial end of the guide stem 215. The coupling head 216 has a general plate shape, with two projections 220 extending outwardly in the axial direction thereof. The maximum transverse dimension of the coupling head is bigger than that of the guide stem 215. Cylindrical output arms 217 are provided on the outer peripheral wall of the guide stem 215 and extending outward in a radial direction. There may be two output arms symmetrically distributed radially around the axial line of the guide stem 215. The output arms 217 are configured to contact with the input arms 210 to transfer a torque.

Figure 6:
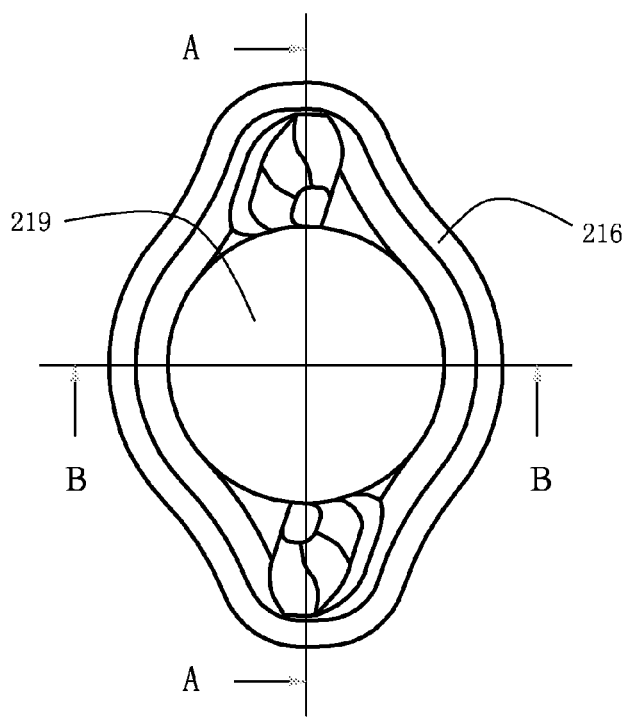
FIG. 6 is a side view of a driven shaft of the torque receiving assembly, as seen from the drive shaft side, according to the embodiment of the present invention.
Figure 6A:
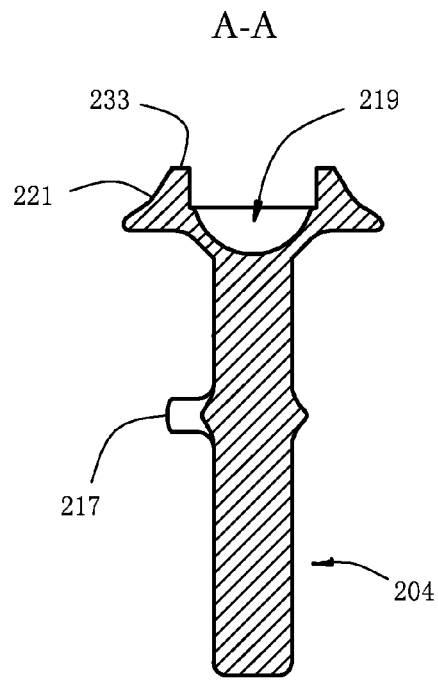
FIGS. 6a and 6b are cross-sectional views taken along A-A and B-B in FIG. 6 respectively.
Figure 6B:
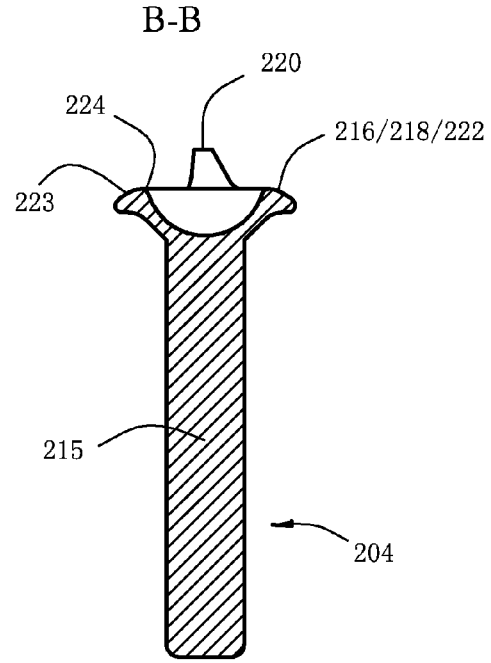
Figure 7A:
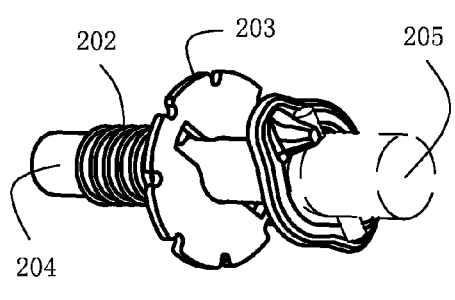
FIGS. 7a and 7b are perspective views which illustrate an assembly state of the driven shaft and a distance-limiting mechanism of the torque receiving assembly according to the embodiment of the present invention.
Figure 7B:
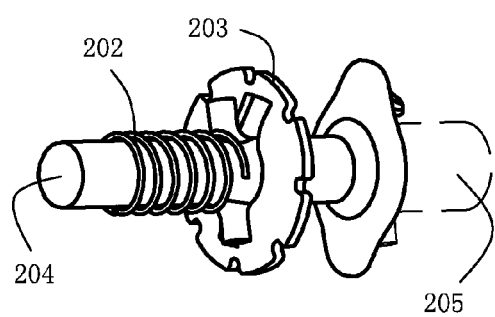

A spherical recess 219 is provided on outer end wall 218 of the coupling head 216 at the center portion. The spherical center of the recess 219 is located on the rotational line or axial line of the guide stem 215. Projections 220 are provided on the outer end wall 218 around the recess 219 and extending from the outer end wall 218 to a pre-determined length in the axial direction of the guide stem 215. The length is longer than a diameter of a drive pin 230 which will be described hereinafter. Referring to FIG. 6, FIGS. 6a and 6b, the dimension of the projections in the radial direction of the guide stem 215 is tapering along the extending direction. Or in more detail, at the driven side of the projection 220, which is a side opposite to the guide stem 215, the distance between the outmost portion of the projection 220 in the radial direction of the guide stem 215 and the axial line of the guide stem reduces gradually along the extending direction of the projection, and thus forming a smooth blending surface 221. The projections may be two, and they are symmetrically distributed around the axial line of the guide stem 215.

As an improvement, an adjustment may be made on the portion around the recess 219 of the outer end wall 218 in the coupling head 216, that is, the portion of the outer end wall 218 around the recess 219 can protrude outward away from the guide stem 215 along the axial direction of the guide stem 215, thus a ridged-convex surface 222 can be formed. Specifically, the portion of the outer end wall 218 around the recess 219 is forming a ridged-convex surface 222 while protruding away from the guide stem 215 along the axial direction of the guide stem 215, so that the ridged-convex surface 222 has an outer portion and an inter portion in the radial direction of the guide stem at a cross-section parallel to the axial direction of the guide stem 215. Related to the outer portion of the ridged-convex surface 222 in the radial direction of the guide stem 215, the distance between the ridged-convex surface 222 and the axial line of the guide stem 215 decreases as the distance from the guide stem 215 increases, thus forming a blending surface 223. Related to the inner portion of the ridged-convex surface 222 in the radial direction of the guide stem 215, the distance between the ridged-convex surface 222 and the axial line of the guide stem 215 is expanding in the extending direction away from the guide stem, thus forming a bending surface 224. In a cross-section parallel to the axial direction of the guide stem 215, the blending surfaces 223 and 224 connect smoothly at end portion of the outer end wall 218 in the axial direction of the guide stem 215, and the connecting portion are protruding away from the guide stem 215, and forming the ridged-convex surface 222. In a cross-section parallel to the axial direction of the guide stem 215, the end of the blending surface 224 connects the recess 219 smoothly in the radial direction of the guide stem.

The retaining cover 203 is mainly like a disc. Eight notches 225 are provided on the outer peripheral portion of the cover and symmetrical distributed about the central line of the retaining cover 203.

The notches 225 are provided with configurations corresponding to the step portions 214 in such a way that the retaining cover 203 is able to be mounted on the body 201 at a proper position. A round hole 226 is provided at the central portion of the retaining cover 203. The hole 226 is in clearance fit with or slightly bigger the guide stem 215, so that the guide stem 215 can move in the rotational axis direction relative to the cover 203. A slot 227 is provided co-axially with the hole 226, with one overlapped with the other. The size of the slot 227 is bigger than the diameter of the arms 217, so the output arms 217 can pass through the slot 227 when mounting the driven shaft 204 onto the body 201.

As a component of a laser beam printer, the drive shaft 205 has a cylindrical body 228. At an end of the cylindrical body 228 in the axial direction, a spherical head 229 is provided. The other end of the cylindrical body 228 in the axial direction couples with a rotational driving force output mechanism (not shown) such as a driving shaft of the laser printer. A drive pin 230, which is perpendicular to the rotational axis of the drive shaft 205, are provided adjacent to the head 229. The spherical center of the head 229 is positioned on the rotational axis of the drive shaft 205.

In the process of making the torque receiving assembly 200, the guide stem 215 with the arms 217 will penetrate the central hole 226 with the slot 227 until the guide stem 215 enters the guiding hole 212. After the cover 203 is fixed to body 201, the arms 217 are offset from the slot 227 (referring to FIGS. 7a and 7b), such that the driven shaft 204 is retained in the body 201. By this, the driven shaft 204 is prevented from disengaging from the body 201.

After assembled, the torque receiving assembly 200 achieved has the following constitute relations among the elements. A segment of the guide stem 215 from the free end to the output arm 217 is limited in the accommodating chamber 209. The coil spring 202 is set around a segment of the guide stem 215 between the bottom surface of the accommodating chamber 209 and the output arms 217. One end of the urging spring 202 is against to a portion of the output arms 217 which is facing the bottom surface of the accommodating chamber 209, the other end is against to the bottom wall 231 of the accommodating chamber 209. In the circumferential direction of the accommodating chamber 209, the output arms 217 are ready for engagement with the input arms 210. The free end of the guide stem 215 is inserted into the guiding hole 212, the guide stem 215 can move reciprocally in the axial direction of the guiding hole 212 relative to the guiding hole 212 and the accommodating chamber 209. In the axial reciprocating movement of the guide stem 215, a distance-limiting mechanism 232, including the retaining cover 203 and the urging spring 202, defines a maximum distance the driven shaft 204 is able to move relative to the body 201 in the axis direction. The maximum distance equals to a distance of the output arm 217 from the cover 202 to a position where the compression dead point of the coil spring 202 is achieved. In other words, in the axis direction, the driven shaft 204 is movable relative to the body 201 between a first position where the output arms 217 of the driven shaft 204 makes in contact with the retaining cover 203 and a second position where the urging spring 202 interposed between the output arms 217 and the bottom wall 231 of the chamber 209 are completely compressed into a dead point by the output arms 217.

After the drive shaft 205 engaging with the driven shaft 204, the spherical head 229 and the outer end wall 218 of the coupling head 216 face each other and the state is maintained, the spherical head 229 is pressed into the recess 219 of the driven shaft 204, the drive pin 230 contact with and against to the projections 220 in the circumferential direction of guide stem 215, and the center of the spherical head 229 is positioned at the axis. Specifically, when the driven shaft 204 is pressed by the drive shaft 205, the urging spring 202 will retreat toward the insert portion 207 along the guiding hole 212 by elasticity, until a space needed for engagement of the drive shaft 205 and the coupling head 216 is released. The length of the space is equal to a retract distance with which the coupling head 216 is moved toward the insert portion 207. The retract distance is longer than the axial length of the projection which begins at the outer end wall 218 of the coupling head 216 and terminates at the free end of the projection 220. When the driven shaft 204 is at a natural state, under which no contact between the drive shaft 205 and the driven shaft 204, the spring 202 will push the driven shaft 204 outwardly until the output arms 217 contact the retaining cover 203 in the accommodating chamber 209.

In the abovementioned construction state, when the torque receiving assembly 200 is fixed to an external torque receiving device such as drum cylinder 114, that is, the insert portion 207 of the body 201 is inserted into the cavity of the drum cylinder 114 and fixed, a photosensitive drum 101 having image forming function is formed. When the photosensitive drum 101 is assembled into a process cartridge having a developing agent, and coupling with an external rotation driving output device such as a drive shaft 205 of a laser printer, the process cartridge will be fully mounted into the laser printer. Referring to FIGS. 8, 9 and 10, and combining with other figures, the spherical head 229 provided on the end of the drive shaft 205 of the laser printer will press the ridged-convex surface 222 of the driven shaft 204 or the projections 220 of the coupling head 216, and make the driven shaft 204 retreat along the guiding hole 212 toward the insert portion 207, i.e. arrow x shown in FIG. 10. Simultaneously the driven shaft 204 will move in the radial or lateral direction of the drive shaft 205, i.e. arrow y shown in FIG. 10, so the spherical head 229 of the drive shaft 205 will slide along the blending surface 223 of the ridged-convex surface 222 or the blending surfaces 221 of the projections 220, and the spherical recess 219 of the coupling head 216 will align with the spherical head 229 of the drive shaft 205 gradually. After perfect alignment between the spherical recess 219 and the spherical head 229 is achieved, the pressure from the spherical head 229 to the driven shaft 204 is vanished, and the driven shaft 204 urged by the urging spring 202 in the opposite direction moves reversely in z direction which is opposite to the arrow x shown in FIG. 10, until the spherical head 229 slides gradually and fully inserts into the spherical recess 219, the engagement of the torque receiving assembly 200 and the external torque output device, i.e. the laser printer is completed. At that time, the projections 220 of the coupling head 216 and the drive pin 230 of the drive shaft 205 are engaged with each other. The engagement may happen after an idle angle as the projections may not go to the contact position at first, in other words, the projections 220 may be offset from the drive pin 230 in the circumferential direction at the beginning.

Torque generated in the laser printer is transmitted to the projections 220 of the driven shaft 204 by the drive pin 230 of the drive shaft 205, then along a transmission path including the guide stem 215, the output arm 217, the input arms 210 and the insert portion 207 to downstream device, such as the drum cylinder 114 or other mechanism which is engaging with the helical gear 206, such as a developing roller 105 or an agitator (not shown).

Figures 11A, 11B:
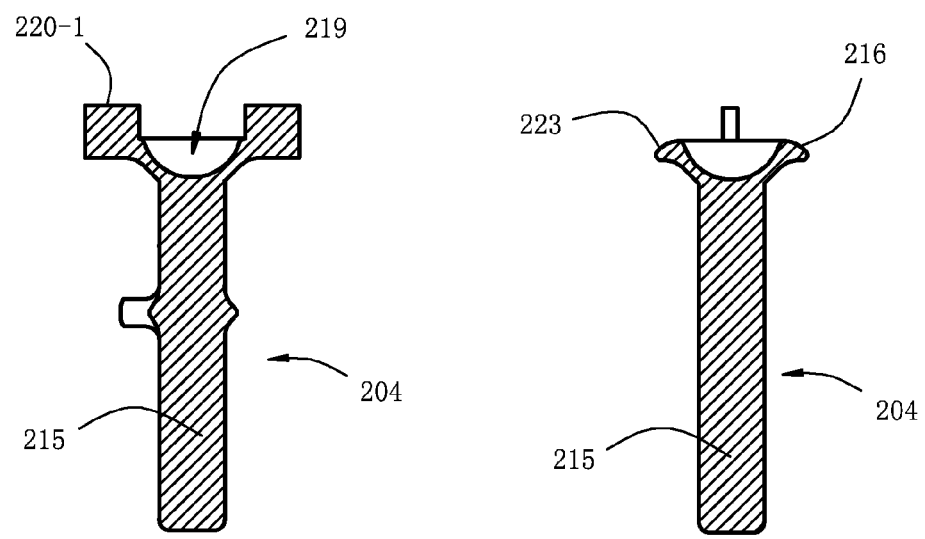
FIGS. 11a and 11b are cross-sectional views of a torque receiving assembly according to a second embodiment of the present invention.

FIGS. 11a and 11b are two cross-sectional views of a driven shaft of a second embodiment of the torque receiving assembly according to the invention. In the second embodiment, the main structure of the torque receiving assembly is substantially same with that of the first embodiment, the point this embodiment differs from the first embodiment is that the projections 220-1 have a rectangle shape in a cross-section parallel to the axial direction of the guide stem 215. The projections 220-1 are provided on the coupling head 216 opposite to the guide stem 215 and out of the guide stem 215 in the radial direction, and extending in the axial direction away from the guide stem 215, and the opposite surfaces of the projections 220-1 are parallel to each other along the axial direction of the guide stem 215. In this configuration, when the spherical-shaped raised head 229 of the drive shaft 205 contacts and presses the edges of the projections 220-1 or the coupling head 216, the rectangle-shaped projections 220-1 or the blending surface 223 of the coupling head 216 still will slide along the spherical surface of the raised head 229 for the spherical-shaped raised head 216 having spherical property, and the spherical-shaped recess 219 of the coupling head 216 will align with the spherical-shaped raised head 229 gradually. After perfect alignment is achieved, the pressure from the spherical-shaped raised head 229 to the driven shaft 204 is vanished, then the driven shaft 204 urged by the coil spring 202 in the opposite direction moves reversely in z direction which is opposite to arrow x shown in FIG. 10, until the spherical-shaped raised head 229 slides gradually and fully inserts into the spherical-shaped recess 219, the engagement of the torque receiving assembly 200 and the external torque output device, i.e. the laser printer is completed.

Figure 12A:
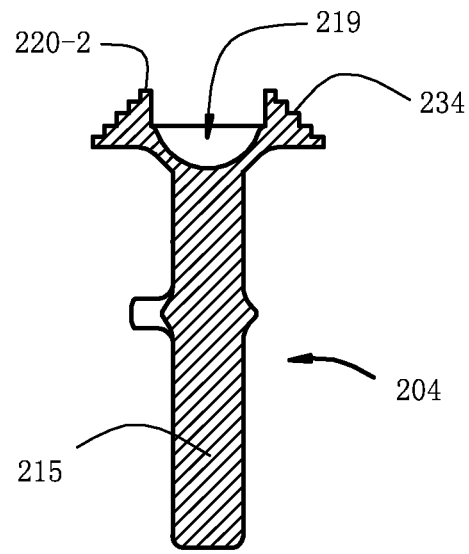
FIGS. 12a and 12b are cross-sectional views of a torque receiving assembly according to a third embodiment of the present invention.
Figure 12B:
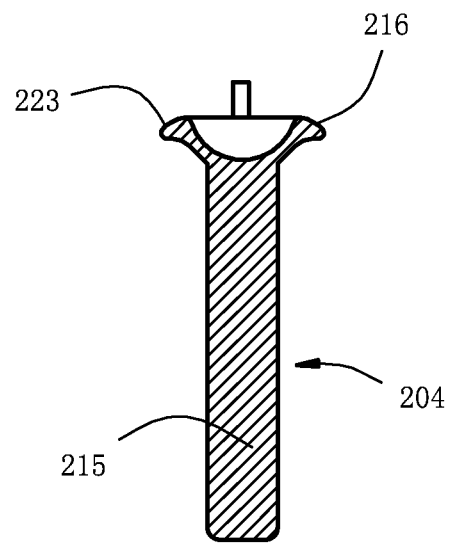

FIGS. 12a and 12b are two cross-sectional views of a driven shaft of a third embodiment of the torque receiving assembly according to the invention. In the third embodiment, the main structure of the torque receiving assembly is substantially same with that of the first embodiment, the point this embodiment differs from the first embodiment is that the projections 220-2 have steps 234 in the cross-section parallel to the axial direction of the guide stem 215. The distance between the steps 234 and the extended axial line of the guide stem 215 becomes tapering gradually along the extending direction of the projections 220-2 away from the guide stem 215. In this configuration, when the spherical-shaped raised head 229 of the drive shaft 205 contacts and presses the edges of the projection 220-2 or the coupling head 216, as the spherical-shaped raised head 229 having spherical property, the steps 234 of the projections 220-1 or the blending surface 223 of the coupling head 216 still will slide along the spherical surface of the raised head 229, and make the spherical-shaped recess 219 of the coupling head 216 aligning with the spherical shaped raised head 229 gradually. After fully alignment is completed, the pressure from the spherical-shaped raised head 229 to the driven shaft 204 is vanished, then the driven shaft 204 urged by the coil spring 202 in the opposite direction moves reversely in the z direction which is opposite to the arrow x shown in FIG. 10, until the spherical-shaped raised head 229 slides gradually and fully inserts into the spherical-shaped recess 219, the engagement of the torque receiving assembly 200 and the external torque output device, i.e. the laser printer is completed.

Figure 13A:
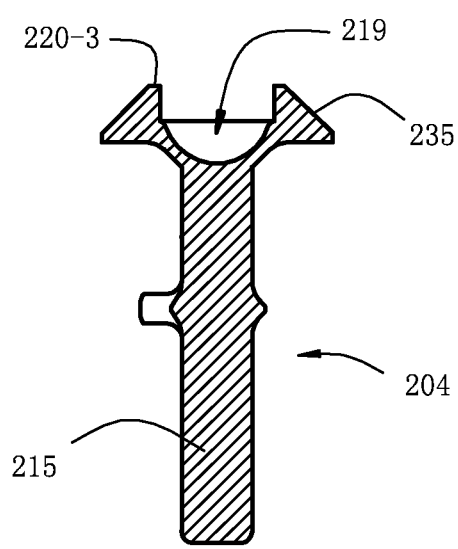
FIGS. 13a and 13b are cross-sectional views of a torque receiving assembly according to a fourth embodiment of the present invention.
Figure 13B:
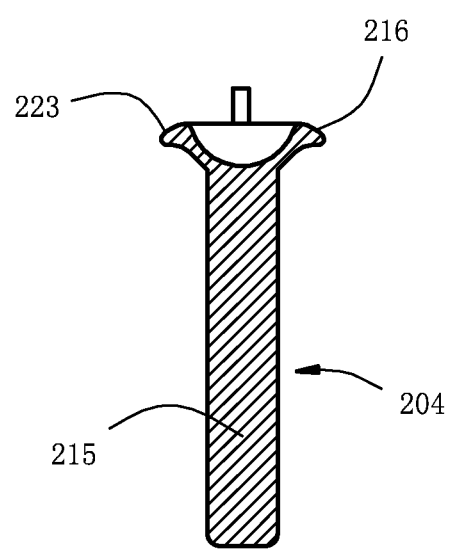

FIGS. 13a and 13b are two cross-sectional views of a driven shaft of a fourth embodiment of the torque receiving assembly according to the invention. In the fourth embodiment, the main structure of the torque receiving assembly is substantially same with that of the first embodiment, the point this embodiment differs from the first embodiment is that the projection 220-1 have a trapezoid shape in a cross-section parallel to the axial direction of the guide stem 215, and a bevel edge 235 of the trapezoid is out of the guide stem 215 in the radial direction. The distance between the bevel edge 235 and the extended axial line of the guide stem 215 becomes tapering gradually along the extending direction of the projections 220-3 away from the guide stem 215. In this configuration, when the spherical-shaped raised head 229 of the drive shaft 205 contacts and presses the edges of the projections 220-1 or the coupling head 216, for the spherical-shaped raised head having spherical property, the bevel edges 235 of the projections 220-3 or the blending surface 223 of the coupling head 216 still will slide along the spherical surface of the raised head 229, and make the spherical-shaped recess 219 of the coupling head 216 aligning with the spherical-shaped raised head 229 gradually. After fully alignment is achieved, the pressure from the spherical-shaped raised head 229 to the driven shaft 204 is vanished, then the driven shaft 204 urged by the coil spring 202 in the opposite direction will move reversely in the z direction which is opposite to the arrow x shown in FIG. 10, and the spherical-shaped raised head 229 will slide gradually and fully inserts into the spherical-shaped recess 219, the engagement of the torque receiving assembly and the external torque output device, i.e. the laser printer will be completed.

Figure 14:
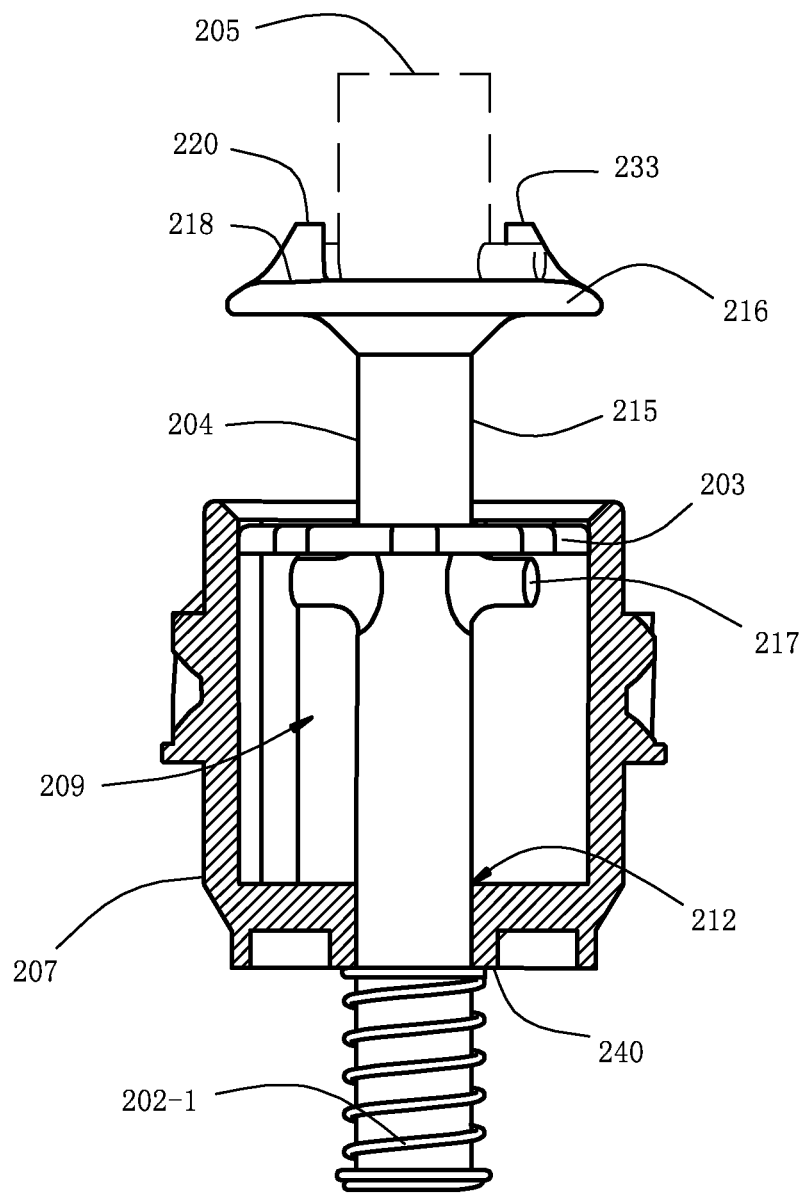
FIG. 14 is partial cross-sectional view of a torque receiving assembly according to a fifth embodiment of the present invention.

FIG. 14 is a partial cross-sectional view of a fifth embodiment of the torque receiving assembly according to the invention. In the fifth embodiment, the main structure of the torque receiving assembly is substantially the same with that of the first embodiment. The aspect differing with the first embodiment is that a tension spring 202-1 is disposed outside of the accommodating chamber 209. The specific configuration is that the guide stem 215 is penetrating into the accommodating chamber 209 and guiding hole 212 successively, and extending out of the guiding hole 212, the spring 202-1 is set around the segment of the guide stem 215 which is extending out of the guiding hole. One end of the spring 202-1 is fixed to the end of the guide stem 215 opposition to the coupling head 216, the other end is connected to the end wall 240 of the guiding hole 212, that is, the outer open of the guiding hole in the axial direction. In this configuration, for the spring 202-1 having elasticity, when the drive shaft 205 urges the driven shaft 204 in the axial direction of the guiding hole 212, the driven shaft 204 will retreat along the guiding hole 212 toward the output position 207, i.e. opposite to coupling head 216, until a space needed for engagement of the drive shaft 205 and the coupling head 216, i.e. a space needed for the spherical-shaped raised head 229 sliding into the spherical recess 219 is released. The length of the space is equal to a retract distance which the coupling head 216 is moving toward the insert portion 207. The retract distance is longer than the height of the projections 220. When the driven shaft 204 is at a natural state without pressure, the spring 202-1 will draw the output arm 217 back and make it against to the outer wall of the retaining cover 203 in the accommodating chamber 209.

Figure 15:
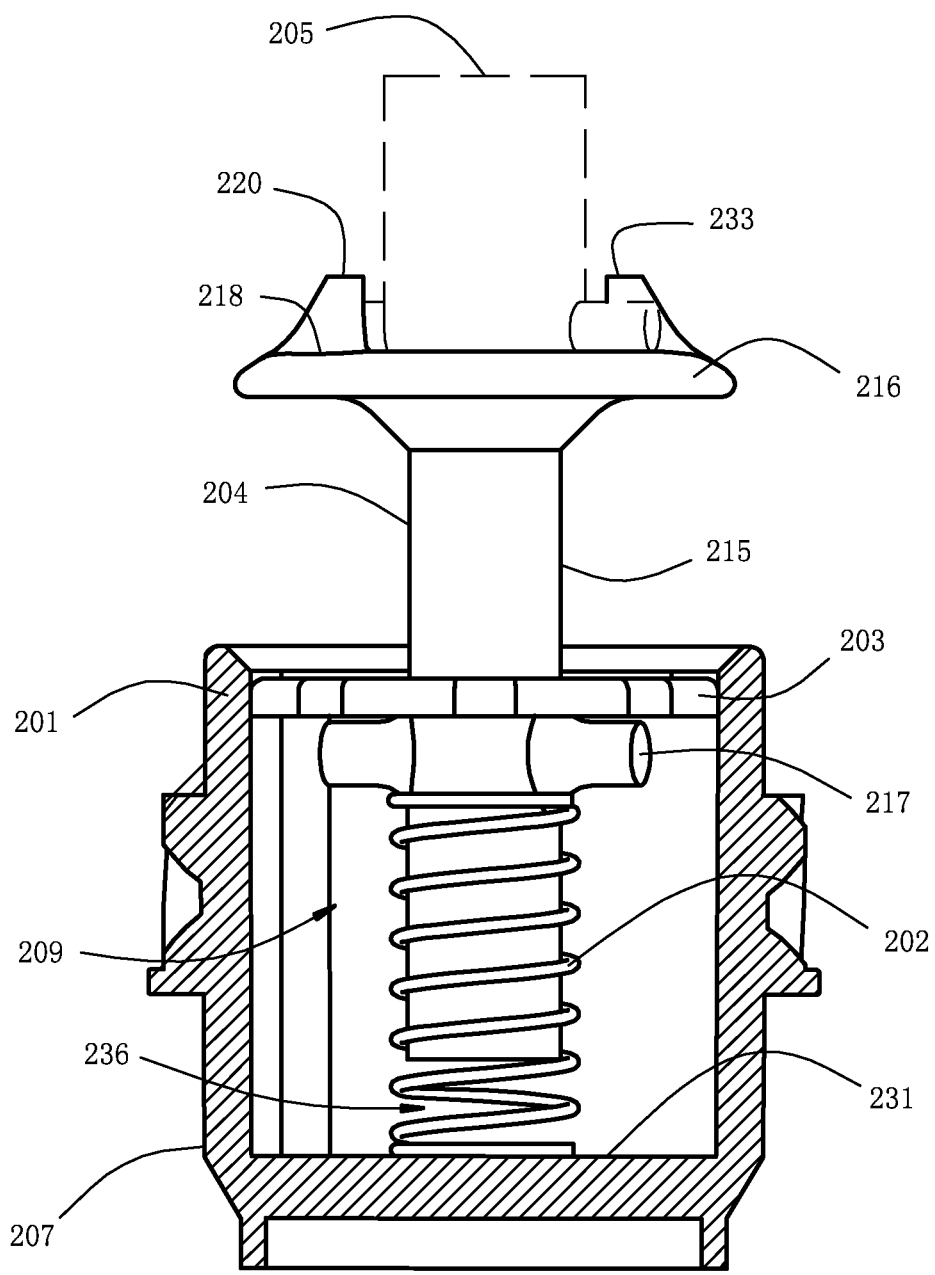
FIG. 15 is partial cross-sectional view of a torque receiving assembly according to a sixth embodiment of the present invention.

FIG. 15 is a partial cross-sectional view of a sixth embodiment of the torque receiving assembly according to the invention. In the sixth embodiment, the main structure of the torque receiving assembly is substantially same with that of the first embodiment, the point this embodiment differs from the first embodiment is that there is no guiding hole provided on the body. The specificity configuration is that, the guide stem 215 is penetrating into the accommodating chamber 209, and a gap 236 is pre-provided between the end of guide stem 215 opposite to the coupling head 216 and the bottom wall 231 of the accommodating chamber 209 in the axial direction of the accommodating chamber 209. The bottom wall 231 and the outer open are provided at two ends of the accommodating chamber 209 respectively. The width of the gap 236 in the axial direction of the accommodating chamber 209 is longer than the length of the projection 220. The coil spring 202 is set around a segment of the guide stem 215 which is accommodated in the accommodating chamber 209. One end of the coil spring 202 is against to the output arm 217, and the other end is against the bottom wall 231 of the accommodating chamber 209. In this configuration, as the coil spring 202 having elasticity, when the drive shaft 205 urges the driven shaft 204 in the axial direction of the accommodating chamber 209, the driven shaft 204 will retreat toward the output position 207, until a space needed for engagement of the drive shaft 205 and the coupling head 216, i.e. a space needed for the spherical head 229 sliding into the spherical recess 219 is released. The length of the space is equal to a distance which the coupling head 216 is moving toward the insert portion 207 and provided by the gap 236. The two distances are both longer than the length of the projection 220. When the driven shaft 204 is at a natural state, the coil spring 202 will push the output arm 217 and make it against to the retaining cover 203 in the accommodating chamber 209.

Figure 16:
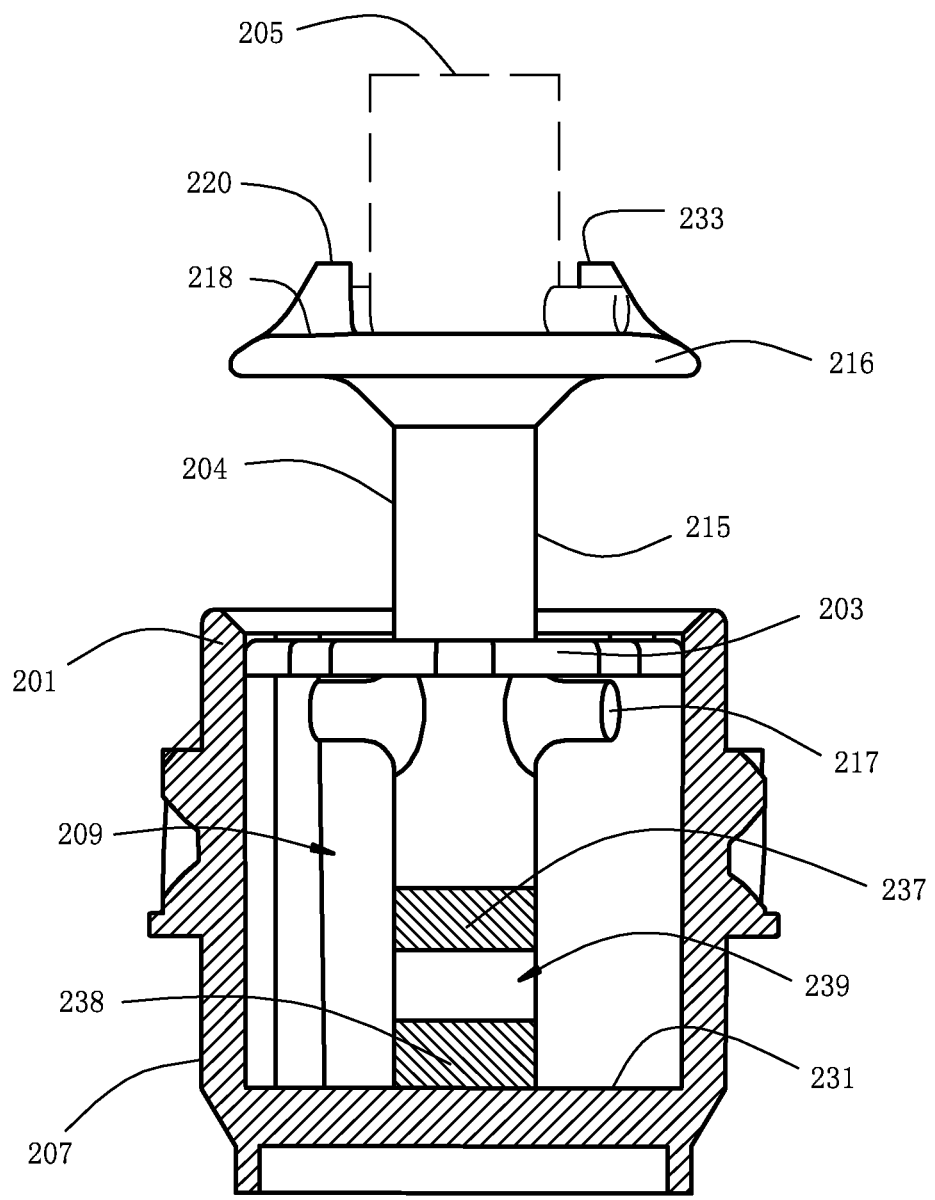
FIG. 16 is partial cross-sectional view of a torque receiving assembly according to a seventh embodiment of the present invention.

FIG. 16 is a partial cross-sectional view of a seventh embodiment of the torque receiving assembly according to the invention. In the seventh embodiment, the main structure of the torque receiving assembly is substantially same with that of the first embodiment, the point this embodiment differs from the first embodiment is that two permanent magnets replace the urging spring 202, and there is no guiding hole provided on the body 201. The specificity configuration is that, a first magnet 237 is fixed to the end of the guide stem 215 opposite to the input head. A second magnet 238 is fixed on the bottom wall 231 of the accommodating chamber 209 which is opposite to the outer open of the accommodating chamber 209 in the axial direction of the body. Or exactly speaking, the bottom wall 231 and the outer open are provided at two ends of the accommodating chamber 209 respectively. In the radial direction of the body 201, the position of the first magnet and the second magnet are aligned with each other. The first magnet and the second magnet are disposed with two same polarities facing each other. In the axial direction of body 201, a gap 239 is pre-provided between the first and second magnets. The width of the gap 239 in the axial direction of the accommodating chamber 209 is longer than a projecting length projected in the axial direction of the accommodating chamber 209 of a distance between the outer end wall 218 of the coupling head 216 and the extending end of the projection 220 in the axial direction of the accommodating chamber 229. In this configuration, for repulsion force generating between the first and second magnets, when the drive shaft 205 urges the driven shaft 204 in the axial direction of the accommodating chamber 209, the driven shaft 204 will retreat toward the output position 207, until a space needed for engagement of the drive shaft 205 and the coupling head 216, i.e. a space needed for the spherical shaped-raised head 229 sliding into the spherical shaped recess 219 is released. The length of the space is equal to a distance which the coupling head 216 is moving toward the insert portion 207 and provided by the gap 239. The two distances are both longer than the length of the projection 220. When the driven shaft 204 is at a natural state, repulsion force generating between the first and second magnets will urge the output arm 217 and make it against to the outer wall of the retaining cover 203 in the accommodating chamber 209, and the spherical raised head 229 will be fully inserted into the spherical recess 219.

Figure 17:
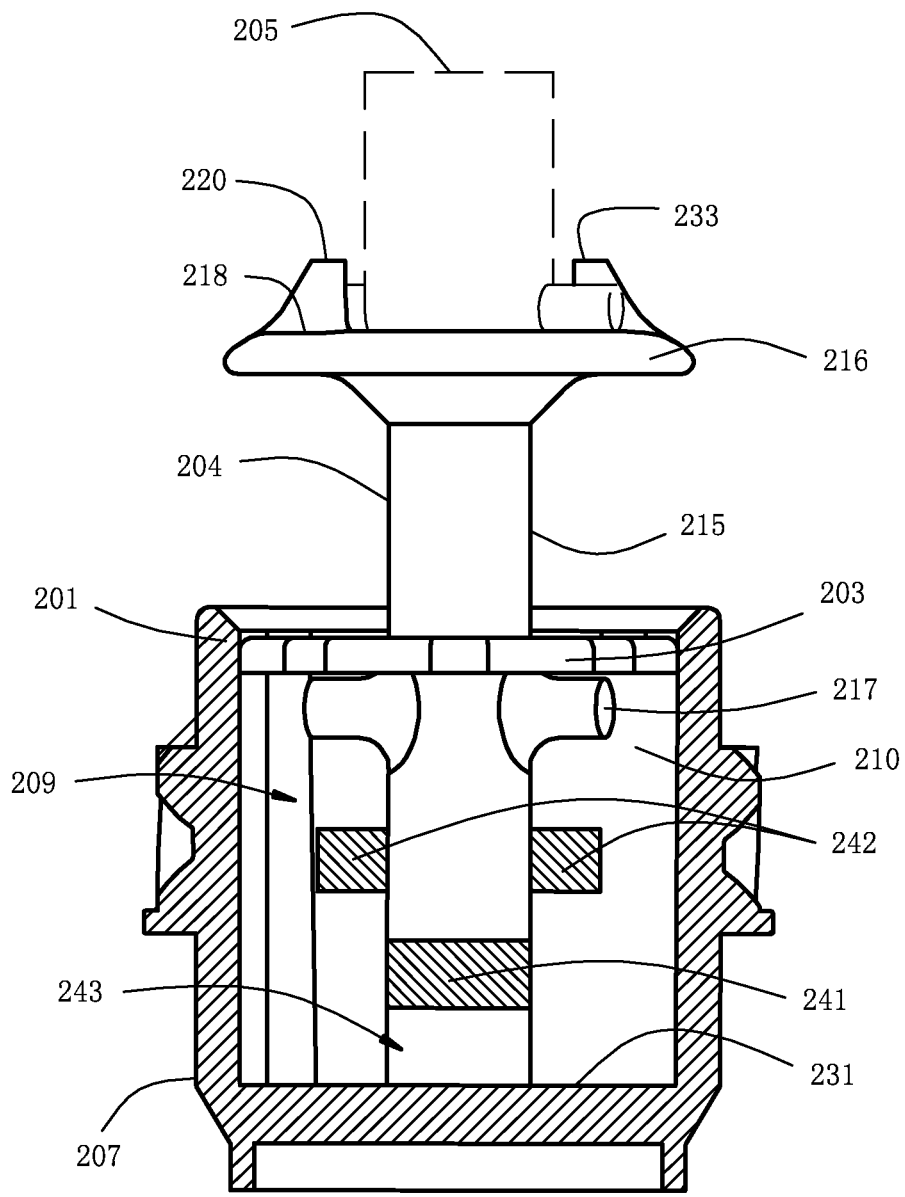
FIG. 17 is partial cross-sectional view of a torque receiving assembly according to an eighth embodiment of the present invention.

FIG. 17 is a partial cross-sectional view of an eighth embodiment of the torque receiving assembly according to the invention. In the eighth embodiment, the main structure of the torque receiving assembly is substantially same with that of the first embodiment, the point this embodiment differs from the first embodiment is that two permanent magnets replace the coiling spring 202, and there is no guiding hole provided on the body 201. The specificity configuration is that, a first magnet 241 is fixed to the end of the guide stem 215 opposite to the input head. A second magnet 242 is a ring and fixed on the input arm 210 in the accommodating chamber 209, the second magnet is provided between the first magnet 241 and the output arm 217 in the axial direction of the accommodating chamber 209. The ends of the first magnet and the second magnet which are facing each other have different polarities. The guide stem 215 is slideably penetrating into the inner wall of the second magnet. In the axial direction of the accommodating chamber 209, a gap 243 is pre-provided between the first magnet 241 and the bottom wall 231 of the accommodating chamber 209 which is opposite to the outer open of the accommodating chamber 209 in the axial direction of the body 201. Or exactly speaking, the bottom wall 231 and the outer open are provide at two ends of the accommodating chamber 209 respectively. The width of the gap 243 in the axial direction of the accommodating chamber 209 is longer than a projecting length projected in the axial direction of the accommodating chamber 209 of a distance between the outer end wall 218 of the coupling head 216 and the extending end of the projection 220 in the axial direction of the accommodating chamber 229. In this configuration, for attraction force generating between the first and second magnets, when the drive shaft 205 urges the driven shaft 204 in the axial direction of the accommodating chamber 209, the driven shaft 204 will retreat toward the output position 207, until a space needed for engagement of the drive shaft 205 and the coupling head 216, i.e. a space needed for the spherical shaped raised head 229 sliding into the spherical shaped recess 219 is released. The length of the space is equal to a distance which the coupling head 216 is moving toward the insert portion 207 provided by the gap 239. The two distances are both longer than the length of the projection 220. When the driven shaft 204 is at a natural state, attraction force generating between the first and second magnets will draw the output arm 217 back and make it against to the outer wall of the retaining cover 203 in the accommodating chamber 209, and the spherical raised head 229 will be fully inserted into the spherical recess 219.

Figure 18:
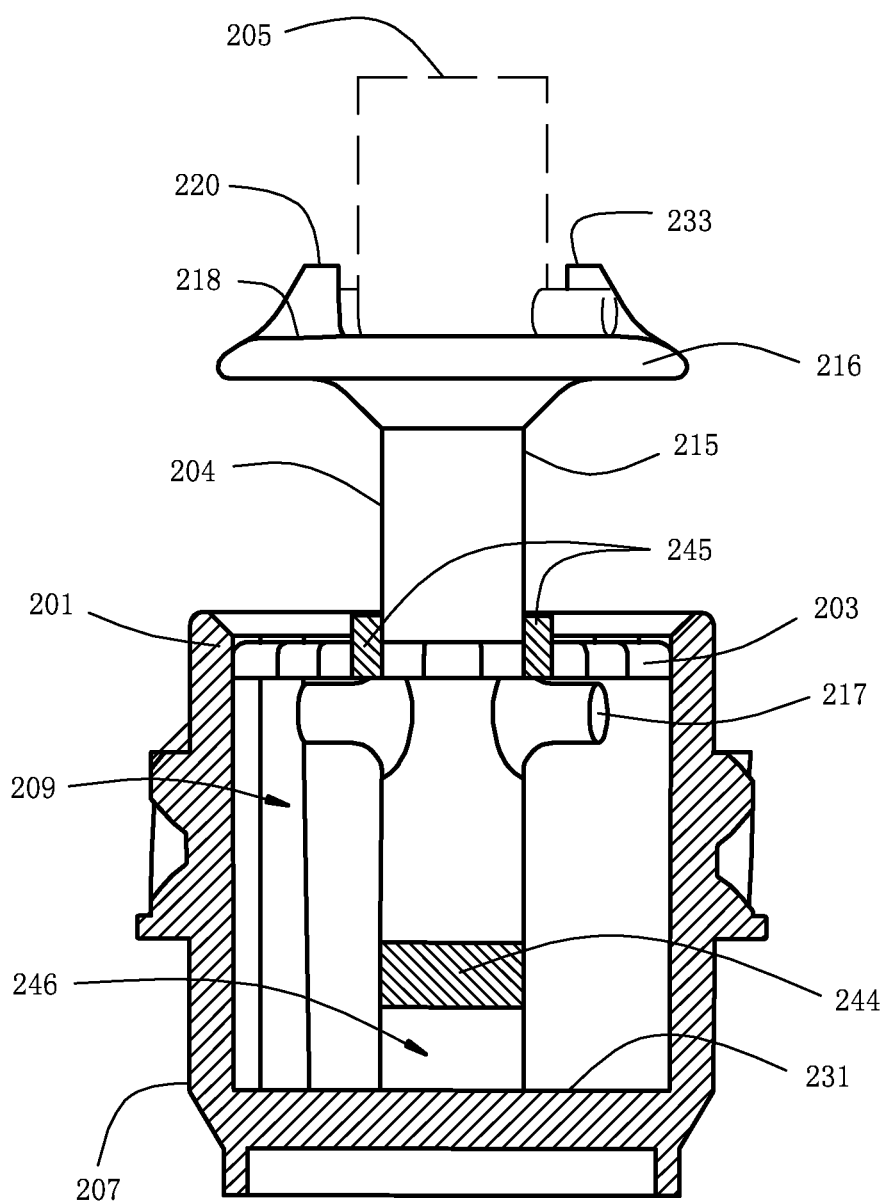
FIG. 18 is partial cross-sectional view of a torque receiving assembly according to a ninth embodiment of the present invention.

FIG. 18 is a partial cross-sectional view of a ninth embodiment of the torque receiving assembly according to the invention. In the ninth embodiment, the main structure of the torque receiving assembly is substantially same with that of the first embodiment, the point this embodiment differs from the first embodiment is that two permanent magnets replacing the coiling spring 202, and there is no guiding hole provided on the body 201. The specificity configuration is that, a first magnet 244 is fixed to the end of the guide stem 215 opposite to the input head. A second magnet 245 is a ring and fixed on the retaining cover 203. The ends of the first magnet and the second magnet which are facing each other have different polarity. The guide stem 215 is slideably penetrated into the second magnet 245. In the axial direction of the accommodating chamber 209, a gap 246 is pre-provided between the first magnet 244 and the bottom wall 231 of the accommodating chamber 209 opposite to the outer open of the accommodating chamber 209 in the axial direction of the body. Or exactly speaking, the bottom wall 231 and the outer open are provide at two ends of the accommodating chamber 209 respectively. The width of the gap 246 in the axial direction of the accommodating chamber 209 is longer than the length of the projection 220. The output arm 217 and the guide stem 215 mate each other in a movable manner, that is, a channel is provided on the guide stem 215 for accommodating the output arm 217, after the guide stem 215 penetrating into the retaining cover 203, the output arm 217 is fixed in the channel. In this configuration, for attraction force generating between the first and second magnets, when the drive shaft 205 urges the driven shaft 204 in the axial direction of the accommodating chamber 209, the driven shaft 204 will retreat toward the output position 207, until a space needed for engagement of the drive shaft 205 and the coupling head 216, i.e. a space needed for the spherical shaped raised head 229 sliding into the spherical shaped recess 219 is released. The length of the space is equal to a distance which the coupling head 216 is moving toward the insert portion 207 provided by the gap 239. The two distances are both longer than the length of the projection 220. When the driven shaft 204 is at a natural state without pressure, attraction force generating between the first and second magnets will draw the output arm 217 back and make it against to the outer wall of the retaining cover 203 in the accommodating chamber 209, and the spherical head 229 will be fully inserted into the spherical recess 219.

Figure 19:
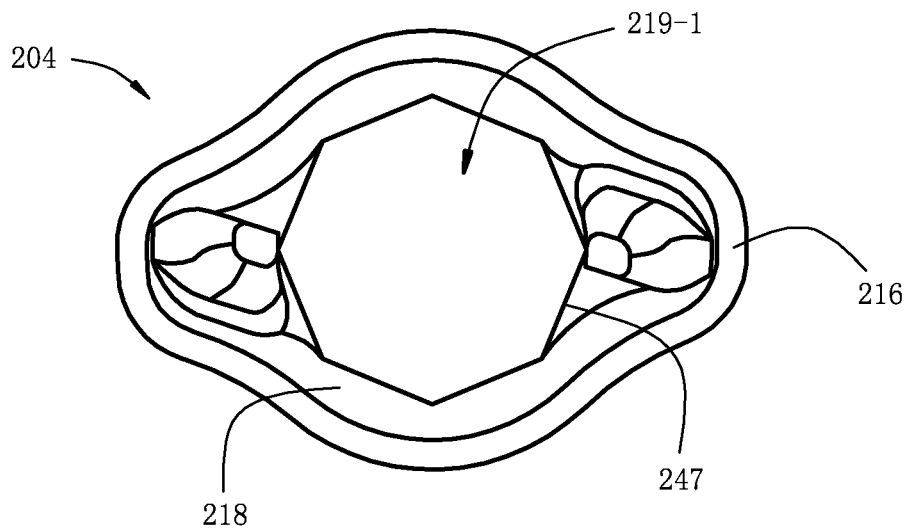
FIG. 19 is a perspective view which illustrates a driven shaft of a torque receiving assembly according to a tenth embodiment of the present invention.

FIG. 19 is a perspective view of a driven shaft 204 of a tenth embodiment of the torque receiving assembly according to the invention. In the tenth embodiment, the main structure of the torque receiving assembly is substantially the same with that of the first embodiment, the point this embodiment differs from the first embodiment is that the shape of the recess of the coupling head 216 provided on the outer end wall 218 and recessing in the longitude direction of the guide stem 215 is a regular octagon, not spherical. The specificity configuration is that, the recess 219-1 provided on the outer wall 247 of the guide stem 215 (referring to the figures for the first embodiment) in a cross-section perpendicular to the axial direction of the guide stem 215 has a regular octagon shape. A center of a circle which passes all the angle points is located at the extended axial line of the guide stem 215. Certainly, the shape of the recess 219-1 in a cross-section perpendicular to the axial direction of the guide stem 215 can be other regular polygon such as triangle, square or pentagon etc.

Figure 20:
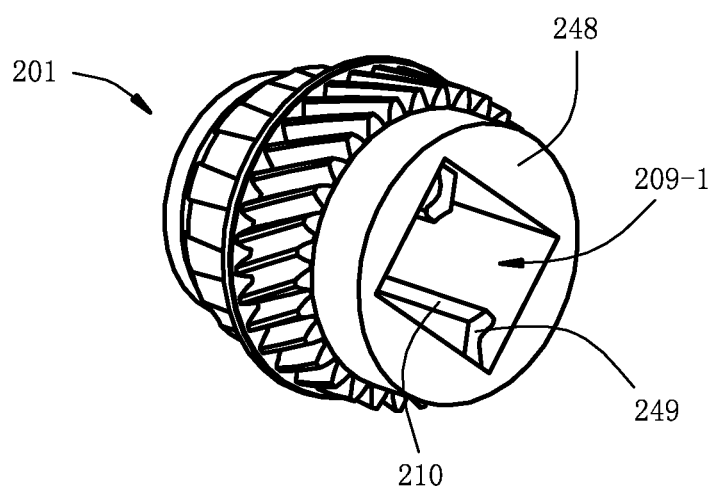
FIG. 20 is a perspective view which illustrates a body of a torque receiving assembly according to an eleventh embodiment of the present invention.

FIG. 20 is a perspective view of a body 201 of an eleventh embodiment of the torque receiving assembly according to the invention. In the eleventh embodiment, the main structure of the torque receiving assembly is substantially same with that of the first embodiment, the point this embodiment differs from the first embodiment is that the shape of the accommodating chamber 208 of the body 210 is a square 209-1, and there is no guide stem 213 and step 214 provided on the inner wall of the square chamber 209-1. The specificity configuration is that, in a cross-section perpendicular to the axial direction of the body 201, the two diagonals of the square meet each other at the center line of the square chamber, and the center line is extending in the axial direction of the body and coinciding with the axial line of the body 201. The input arms 210 in the square chamber 209-1 extending only to a position which is flush with the edges 248 of the outer open of the square chamber 209-1 in the axial direction of the body 201, so that a step is formed between the outer wall 249 of the input arm 210 in the axial direction of the body 201 and the edges of the outer open of the square chamber 209-1, a retaining cover 203 with shape adjusted for corresponding to the square chamber 209-1 (referring to the figures for the first embodiment) is fixed on the outer open of the square chamber 209-1. Certainly, the projection shape of the recess 219-1 can be other regular polygon such as triangle, square or pentagon etc.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque receiving assembly, comprising:
    a body having an axis and having an accommodating chamber;
    a driven shaft disposed coaxially with said body, the driven shaft including a guide stem and a coupling head provided at one axial end of said guide stem, the guide stem having a pair of output arms which extend outwardly in a radial direction, the coupling head having a plurality of projections;
    wherein a pair of input arms are provided at an inner wall of the accommodating chamber and configured for abutting with the output arms;
    the guide stem is movable in an axis direction relative to the body, and the torque receiving assembly further comprises a distance-limiting mechanism that defines a maximum distance the driven shaft is able to move relative to the body in the axis direction;
    wherein the distance-limiting mechanism comprises a retaining cover fixed to an open end of the accommodating chamber to retain part of the driven shaft in the accommodating chamber, and the output arms are disposed between the retaining cover and a bottom wall of the accommodating chamber.

2. The torque receiving assembly according to claim 1, wherein the coupling head having a recess that is coaxial with the driven shaft and has a circular shape; and the driven shaft is rotatable relative to the body around the axis at an angle which is more than 90 degrees and less than 180 degrees.

3. The torque receiving assembly according to claim 2, wherein a portion of the coupling head around the recess is curved and projecting away from the guide stem in the axis direction.

4. The torque receiving assembly according to claim 3, wherein the body includes a guiding hole capable of guiding the guide stem along the axis direction, the distance-limiting mechanism further comprises an urging spring, interposed between the output arms and the bottom wall of the accommodating chamber for urging the driven shaft outwardly in the axis direction.

5. The torque receiving assembly according to claim 3, wherein the body includes a guiding hole capable of guiding the guide stem, the distance-limiting mechanism further comprises a tension spring disposed outside of the accommodating chamber with one end connected to an end of the guide stem and the other end connected to an end wall around the guiding hole of the end body.

6. The torque receiving assembly according to claim 3, wherein the distance-limiting mechanism further comprises an urging spring interposed between the output arms and the bottom wall of the accommodating chamber for urging the driven shaft outwardly in the axis direction, a gap is provided between an end of the driven shaft and the bottom wall when the driven shaft is at a farthest position from the bottom wall, the gap has an axial length that is bigger than an axial length of the projection.

7. The torque receiving assembly according to claim 3, wherein the distance-limiting mechanism further comprises a first magnet and a second magnet, the first magnet is fixed to an end of the guide stem that is opposite to the coupling head, the second magnet is fixed on the bottom wall of the accommodating chamber with a predetermined gap away from the first magnet, the first and second magnets are disposed such that each has a same polarity facing each other.

8. The torque receiving assembly according to claim 3, further comprising a first magnet fixed to an end of the guide stem that is opposite to the coupling head, and a second magnet formed as a ring and disposed in the accommodating chamber at a position that is between the output arms and the first magnet with respect to the axis direction, the first and second magnets are disposed such that each has a different polarity facing each other.

9. The torque receiving assembly according to claim 1, wherein the body includes a guiding hole capable of guiding the guide stem along the axis direction, the distance-limiting mechanism further comprises an urging spring, accommodating chamber, the urging spring is interposed between the output arms and the bottom wall of the accommodating chamber for urging the driven shaft outwardly in the axis direction.

10. The torque receiving assembly according to claim 1, wherein the body includes a guiding hole capable of guiding the guide stem, the distance-limiting mechanism further comprises a tension spring, disposed outside of the accommodating chamber with one end connected to an end of the guide stem and the other end connected to an end wall around the guiding hole of the body.

11. The torque receiving assembly according to claim 1, wherein the distance-limiting mechanism further comprises an urging spring interposed between the output arms and the bottom wall of the accommodating chamber for urging the driven shaft outwardly in the axis direction, a gap is provided between an end of the driven shaft and the bottom wall when the driven shaft is at a farthest position from the bottom wall, the gap has an axial length that is longer than an axial length of the projection.

12. The torque receiving assembly according to claim 1, wherein the distance-limiting mechanism further comprises a first magnet and a second magnet, the first magnet is fixed to an end of the guide stem that is opposite to the coupling head, the second magnet is fixed on the bottom wall of the accommodating chamber with a gap away from the first magnet, the first and second magnets are disposed such that each has a same polarity facing each other, the gap has an axial length that is longer than an axial length of the projection.

13. The torque receiving assembly according to claim 1, wherein the distance-limiting mechanism further comprises a first magnet and a second magnet, the first magnet is fixed to an end of the guide stem that is opposite to the coupling head, the second magnet is formed as a ring and is disposed in the accommodating chamber at a position that is between the output arms and the first magnet with respect to the axis direction, the first and second magnets are disposed such that each has a different polarity facing each other.

14. A photosensitive drum, including a drum cylinder and a torque receiving assembly, the torque receiving assembly comprising:

a body having an axis and having an accommodating chamber;

a driven shaft disposed coaxially with said body, the driven shaft including a guide stem and a coupling head provided at one axial end of said guide stem, the guide stem having a pair of output arms which extend outwardly in a radial direction, the coupling head having a plurality of projections;

wherein a pair of input arms are provided at an inner wall of the accommodating chamber and configured for abutting with the output arms;

the guide stem is movable in an axis direction relative to the body, and the torque receiving assembly further comprises a distance-limiting mechanism that defines a maximum distance the driven shaft is able to move relative to the body in the axis direction;

wherein the distance-limiting mechanism comprises a retaining cover fixed to an open end of the accommodating chamber to retain part of the driven shaft in the accommodating chamber, and the output arms are disposed between the retaining cover and a bottom wall of the accommodating chamber.

15. The photosensitive drum according to claim 14, wherein a guiding hole capable of guiding the guide stem along the axis direction is included, the distance-limiting mechanism further comprises an urging spring, to retain part of the driven shaft in the accommodating chamber, the urging spring is interposed between the output arms and the bottom wall of the accommodating chamber for urging the driven shaft outwardly in the axis direction.

16. The photosensitive drum according to claim 14, wherein the body includes a guiding hole capable of guiding the guide stem, the distance-limiting mechanism further comprises a tension spring disposed outside of the accommodating chamber with one end connected to an end of the guide stem and the other end connected to an end wall around the guiding hole of the body.

17. A process cartridge, including a photosensitive drum, and the photosensitive drum including a drum cylinder and a torque receiving assembly, the torque receiving assembly having a body including a guiding hole capable of guiding a guide stem, a distance-limiting mechanism comprises a retaining cover and a spring, the retaining cover is fixed to an open end of an accommodating chamber to retain part of a driven shaft in the accommodating chamber.

18. The process cartridge according to claim 17, wherein the spring is an urging spring which is interposed between a pair of output arms and a bottom wall of the accommodating chamber for urging the driven shaft outwardly in an axis direction.

19. The process cartridge according to claim 18, wherein a gap is provided between an end of the driven shaft and the bottom wall when the driven shaft is at a farthest position from the bottom wall, the gap has an axial length that is longer than an axial length of a projection.

20. The process cartridge according to claim 17, wherein the spring is a tension spring which is interposed outside of the accommodating chamber with one end connected to an end of the guide stem and the other end connected to an end wall around the guiding hole of the body.

* * * * *